United States Patent
Forsyth et al.

(10) Patent No.: US 9,842,046 B2
(45) Date of Patent: Dec. 12, 2017

(54) PROCESSING MEMORY ACCESS INSTRUCTIONS THAT HAVE DUPLICATE MEMORY INDICES

(71) Applicant: Intel Corporation, Santa Clara, CA (US)

(72) Inventors: Andrew T. Forsyth, Kirkland, WA (US); Dennis R. Bradford, Portland, OR (US); Jonathan C. Hall, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1171 days.

(21) Appl. No.: 13/631,378

(22) Filed: Sep. 28, 2012

(65) Prior Publication Data

US 2014/0095779 A1    Apr. 3, 2014

(51) Int. Cl.
| | |
|---|---|
| *G06F 12/00* | (2006.01) |
| *G06F 12/02* | (2006.01) |
| *G06F 9/30* | (2006.01) |
| *G06F 11/14* | (2006.01) |
| *G06F 3/06* | (2006.01) |

(52) U.S. Cl.
CPC ............... *G06F 12/00* (2013.01); *G06F 3/06* (2013.01); *G06F 9/30* (2013.01); *G06F 9/30036* (2013.01); *G06F 12/0246* (2013.01); *G06F 3/0608* (2013.01); *G06F 3/0641* (2013.01); *G06F 9/30018* (2013.01); *G06F 11/1453* (2013.01)

(58) Field of Classification Search
CPC ............ G06F 9/30018; G06F 9/30036; G06F 11/1453; G06F 3/0608; G06F 3/0641
USPC .................. 711/154, 159, 118; 717/136, 156
See application file for complete search history.

(56) References Cited

U.S. PATENT DOCUMENTS

| | | | | |
|---|---|---|---|---|
| 4,873,630 | A * | 10/1989 | Rusterholz | G06F 9/325 712/3 |
| 6,260,190 | B1 * | 7/2001 | Ju | G06F 9/3834 712/205 |
| 7,093,102 | B1 | 8/2006 | Dulong | |
| 8,447,962 | B2 | 5/2013 | Hughes et al. | |
| 8,510,759 | B1 | 8/2013 | Mcgowan | |
| 8,892,848 | B2 | 11/2014 | Sprangle et al. | |
| 8,966,180 | B2 | 2/2015 | Kim et al. | |
| 8,972,697 | B2 | 3/2015 | Sperber et al. | |
| 8,972,698 | B2 | 3/2015 | Hughes et al. | |
| 9,069,671 | B2 | 6/2015 | Hughes et al. | |

(Continued)

*Primary Examiner* — Mardochee Chery
(74) *Attorney, Agent, or Firm* — Vecchia Patent Agent, LLC

(57) ABSTRACT

A method of an aspect includes receiving an instruction indicating a first source packed memory indices, a second source packed data operation mask, and a destination storage location. Memory indices of the packed memory indices are compared with one another. One or more sets of duplicate memory indices are identified. Data corresponding to each set of duplicate memory indices is loaded only once. The loaded data corresponding to each set of duplicate memory indices is replicated for each of the duplicate memory indices in the set. A packed data result in the destination storage location in response to the instruction. The packed data result includes data elements from memory locations that are indicated by corresponding memory indices of the packed memory indices when not blocked by corresponding elements of the packed data operation mask.

26 Claims, 26 Drawing Sheets

(56) References Cited

U.S. PATENT DOCUMENTS

| | | | |
|---|---|---|---|
| 9,535,624 B1* | 1/2017 | Patterson | G06F 11/1453 |
| 2009/0172364 A1 | 7/2009 | Sprangle et al. | |
| 2010/0042779 A1* | 2/2010 | Espasa et al. | 711/105 |
| 2011/0153983 A1 | 6/2011 | Hughes et al. | |
| 2011/0264863 A1 | 10/2011 | Sprangle et al. | |
| 2012/0144089 A1 | 6/2012 | Hall et al. | |
| 2012/0159130 A1* | 6/2012 | Smelyanskiy et al. | 712/216 |
| 2012/0166761 A1 | 6/2012 | Hughes et al. | |
| 2013/0125097 A1* | 5/2013 | Ebcioglu | G06F 17/5045 717/136 |
| 2014/0351567 A1* | 11/2014 | Plotnikov et al. | 712/225 |

* cited by examiner

*FIG. 3*

METHOD OF GATHERING
DATA IN RESPONSE TO
GATHER INSTRUCTION
320

RECEIVE GATHER INSTRUCTION INDICATING FIRST SOURCE OF PACKED MEMORY INDICES, SECOND SOURCE OF PACKED DATA OPERATION MASK, AND DESTINATION STORAGE LOCATION — 321

STORE PACKED DATA RESULT IN DESTINATION STORAGE LOCATION, PACKED DATA RESULT HAVING DATA ELEMENTS GATHERED FROM MEMORY LOCATIONS INDICATED BY CORRESPONDING MEMORY INDICES WHEN NOT BLOCKED BY CORRESPONDING ELEMENTS OF PACKED DATA OPERATION MASK — 322

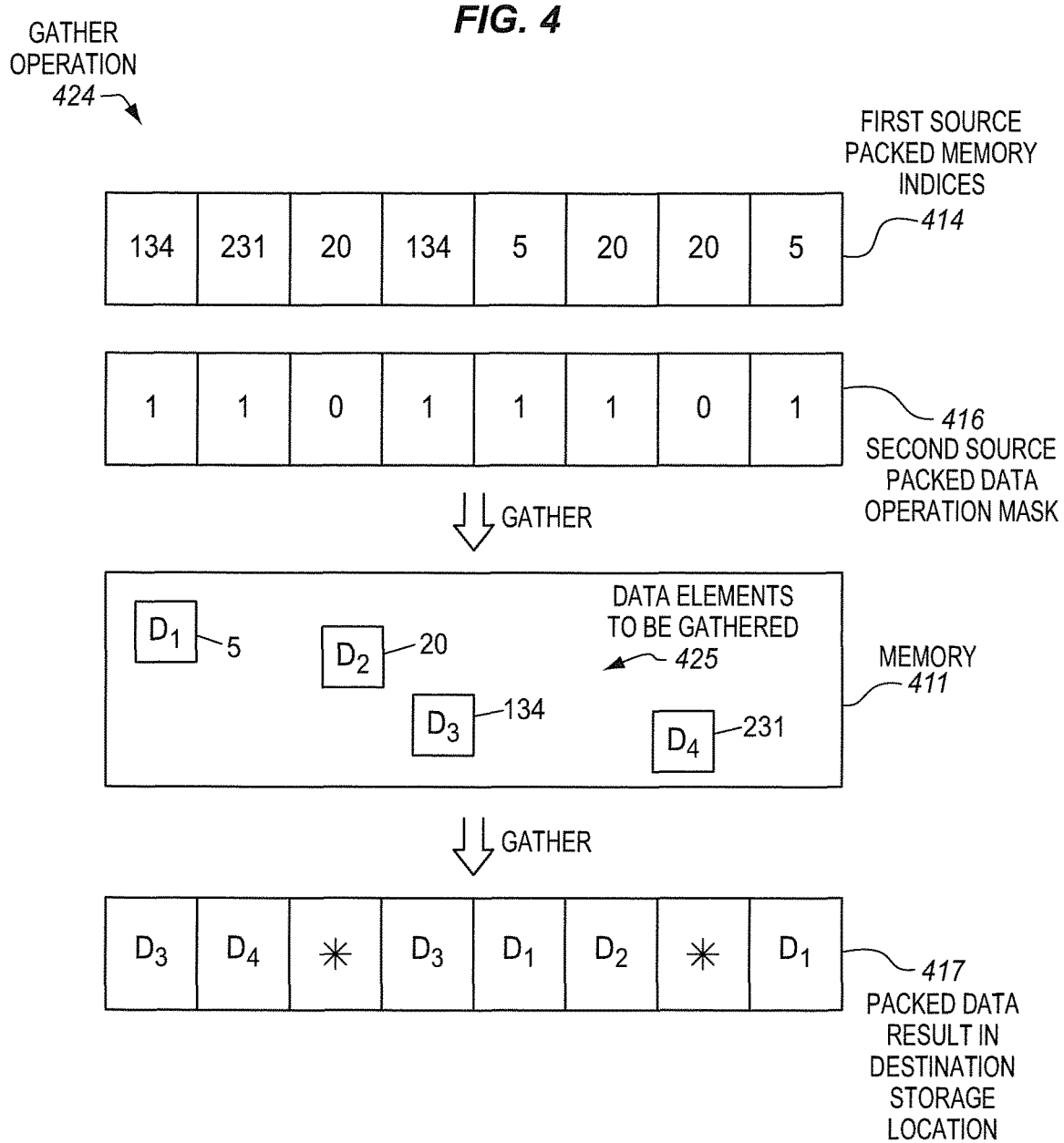

FIG. 5

METHOD OF SCATTERING
DATA IN RESPONSE TO
SCATTER INSTRUCTION
530

RECEIVE SCATTER INSTRUCTION INDICATING FIRST SOURCE OF PACKED MEMORY INDICES, SECOND SOURCE OF CORRESPONDING PACKED DATA ELEMENTS, AND THIRD SOURCE OF PACKED DATA OPERATION MASK — 531

STORE PACKED DATA ELEMENTS OF SECOND SOURCE TO MEMORY LOCATIONS INDICATED BY CORRESPONDING MEMORY INDICES OF FIRST SOURCE WHEN NOT BLOCKED BY CORRESPONDING ELEMENTS OF PACKED DATA OPERATION MASK — 532

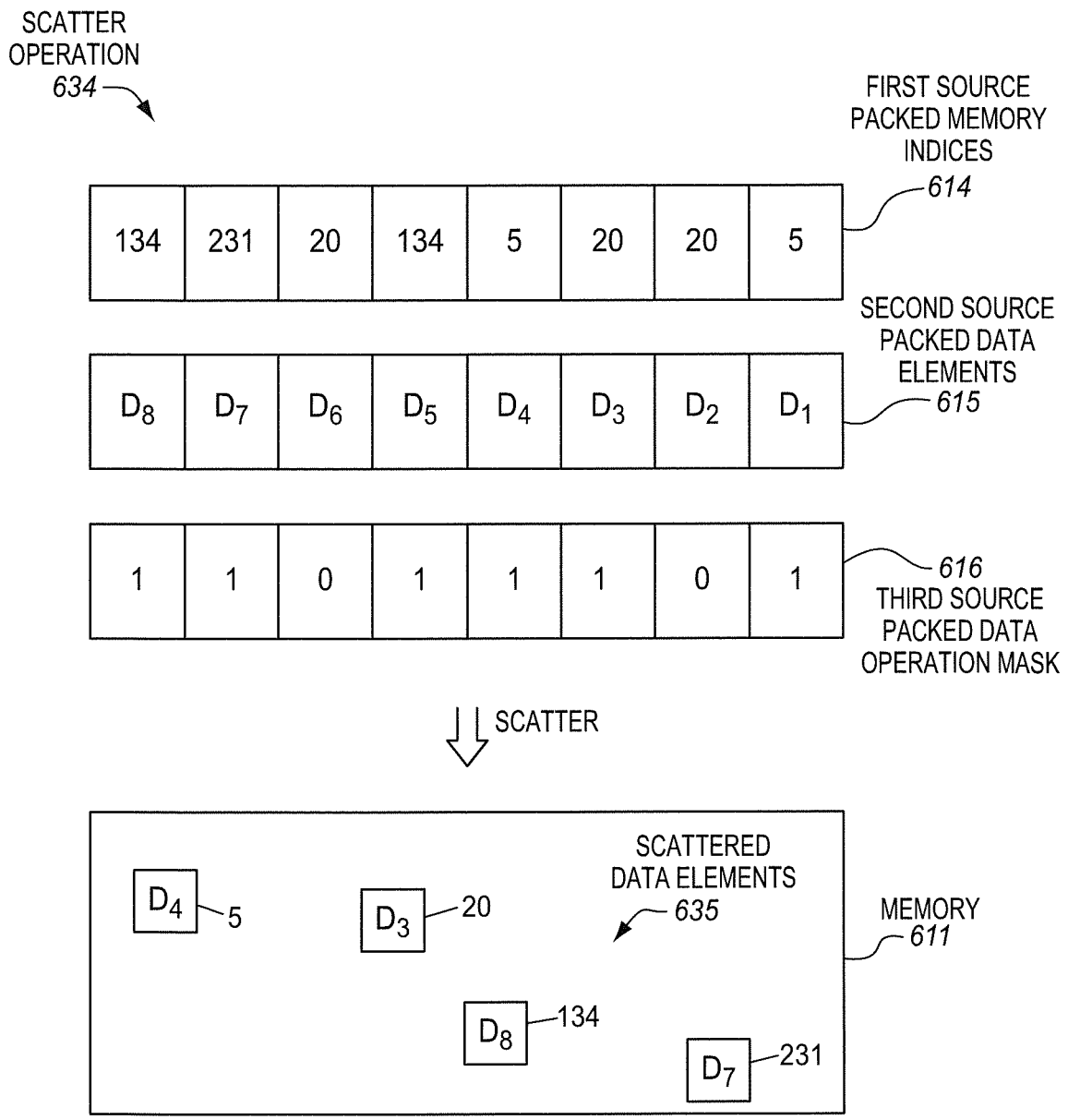

FIG. 12

```
int8 load_mask = received packed data operation mask;
int8 broadcast[8] = init to zeros;
// comparison_result[x][y] is a 1 if the indices in lane x and lane y match
for lane1 = 0 to 7
        if load_mask[lane 1] == 1
                // Always broadcast a lane to itself
                broadcast[lane 1][lane 1] = 1
                // Check all the later lanes
                for lane2 = lane 1 + 1 to 7
                        if comparison_result[lane 1][lane2] == 1
                                // This means lane2 has the same index as lane 1
                                // Do not do a separate load for lane 2
                                load_mask[lane2] = 0
                                // Instead broadcast load result for lane 1 to lane2
                                broadcast[lane 1 ][lane2] = 1
                        endif
                endfor
        endif
endfor
```

| INDICES | 5 | 20 | 20 | 5 | 134 | 20 | 231 | 134 | LOAD MASK |
|---|---|---|---|---|---|---|---|---|---|
| 5 | (1) | (1) | (1) | (1) | (1) | (1) | (1) | (1) | 1 |
| 20 | 0 | 1 | 1 | 0 | 0 | 1 | 0 | 0 | 1 |
| 20 | 0 | 0 | (1) | 0 | 0 | 0 | 0 | 0 | 0 |
| 5 | 1 | 0 | 0 | (1) | 0 | 0 | 0 | 0 | 0 |
| 134 | 0 | 1 | 0 | 0 | (1) | 0 | 0 | 1 | 1 |
| 20 | 0 | 0 | 0 | 0 | 0 | (1) | 0 | 0 | 0 |
| 231 | 0 | 0 | 0 | 0 | 0 | 0 | (1) | 0 | 1 |
| 134 | 0 | 0 | 0 | 0 | 1 | 0 | 0 | (1) | 0 |
| LOAD MASK | 1 | 1 | 0 | 0 | 1 | 0 | 1 | 0 | |
| BROADCAST MASK | 0,3 | 1,2,5 | N/A | N/A | 4,7 | N/A | 6 | N/A | |

FULL COMPARISON RESULT — 1385

FIG. 13

PACKED DATA
OPERATION MASK
REGISTERS
*1509*

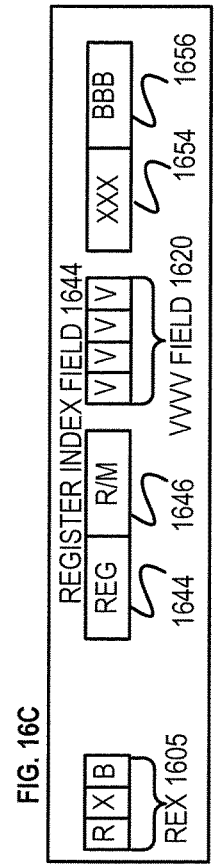
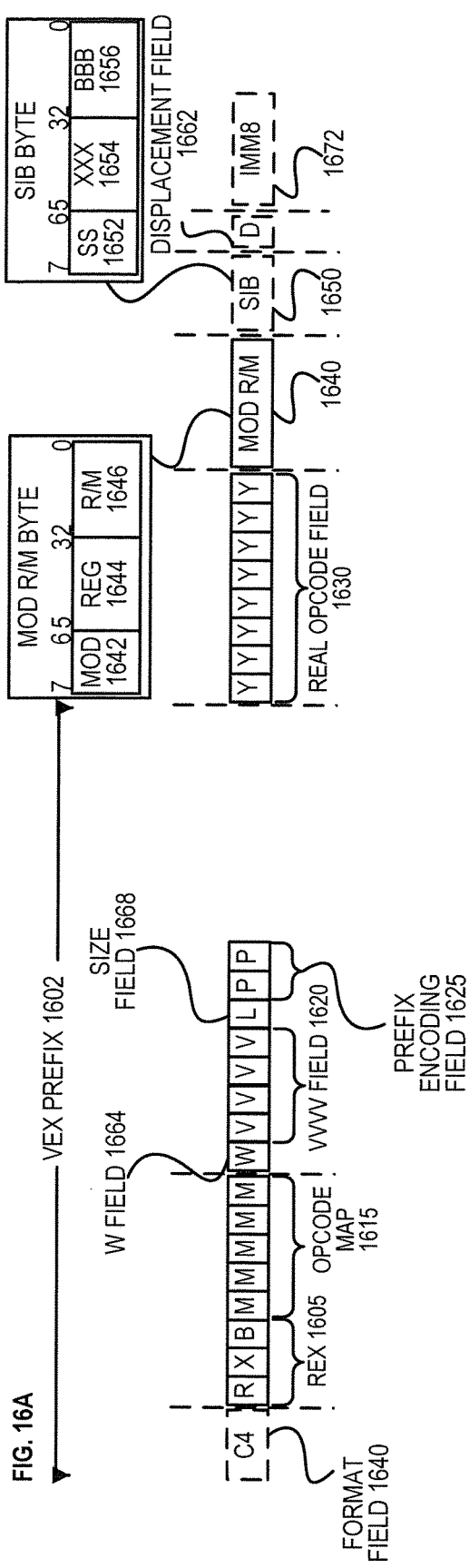
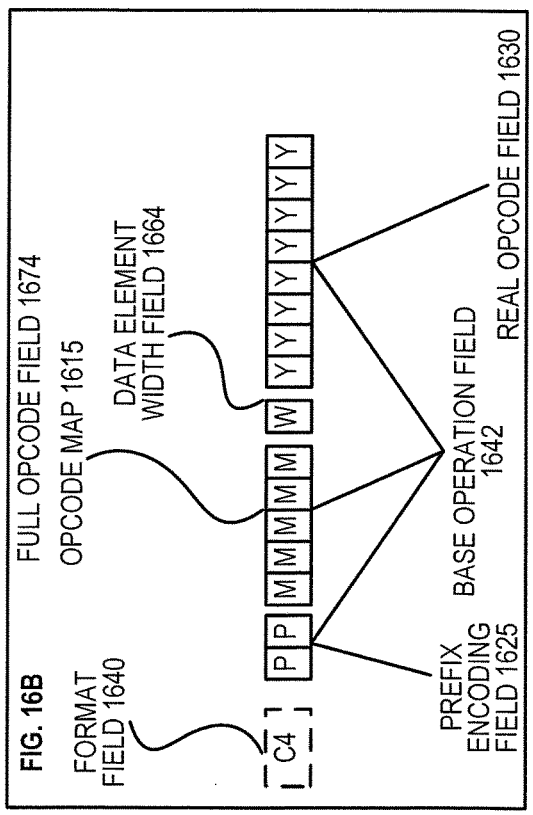
FIG. 16A
FIG. 16B
FIG. 16C

FIG. 17
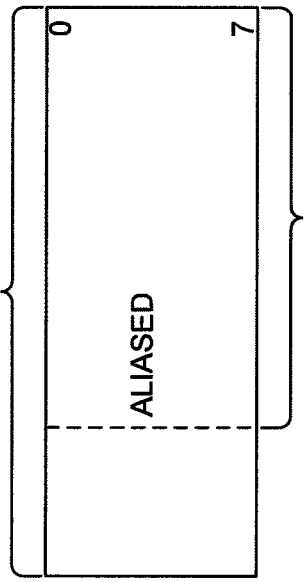
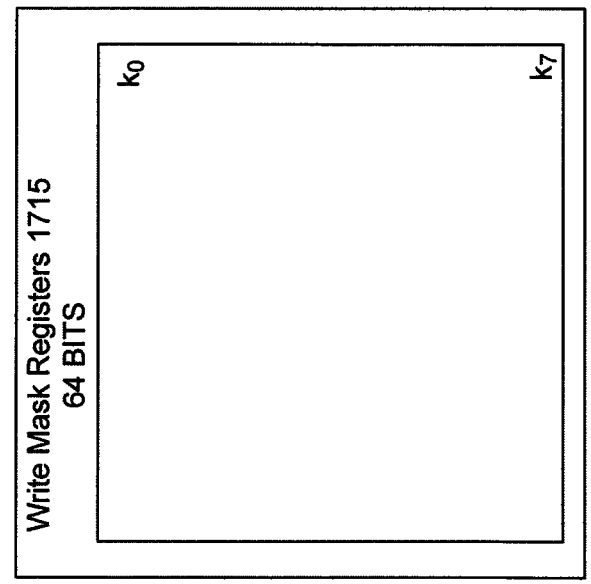
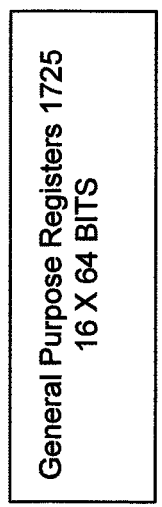
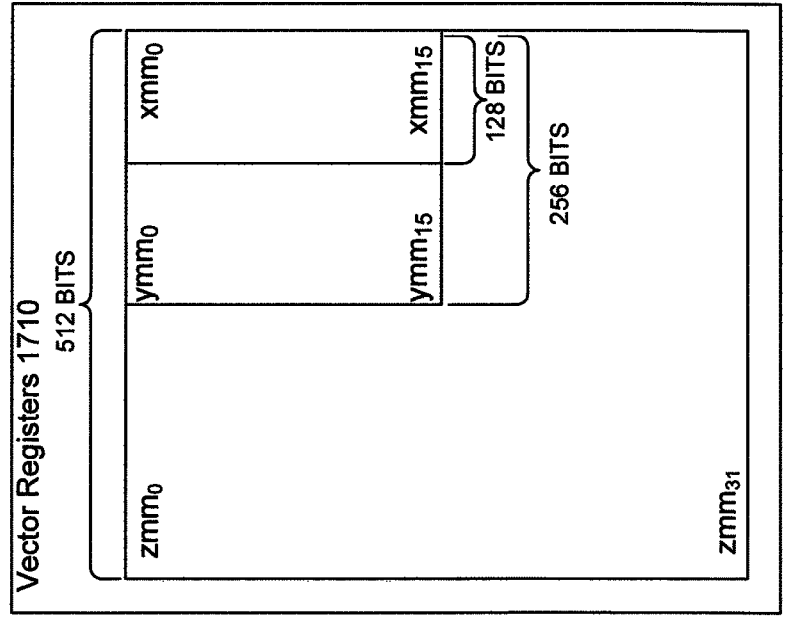

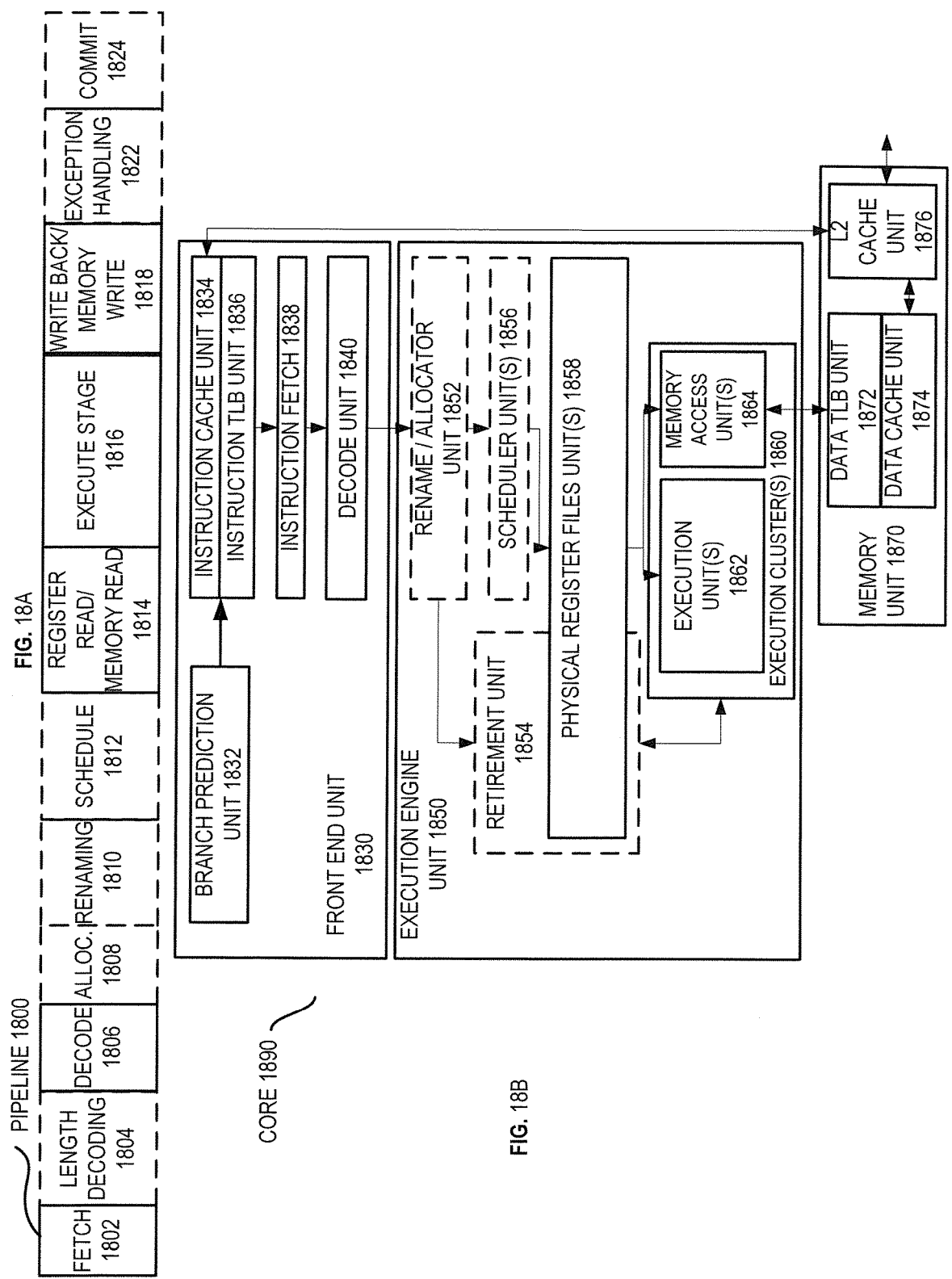

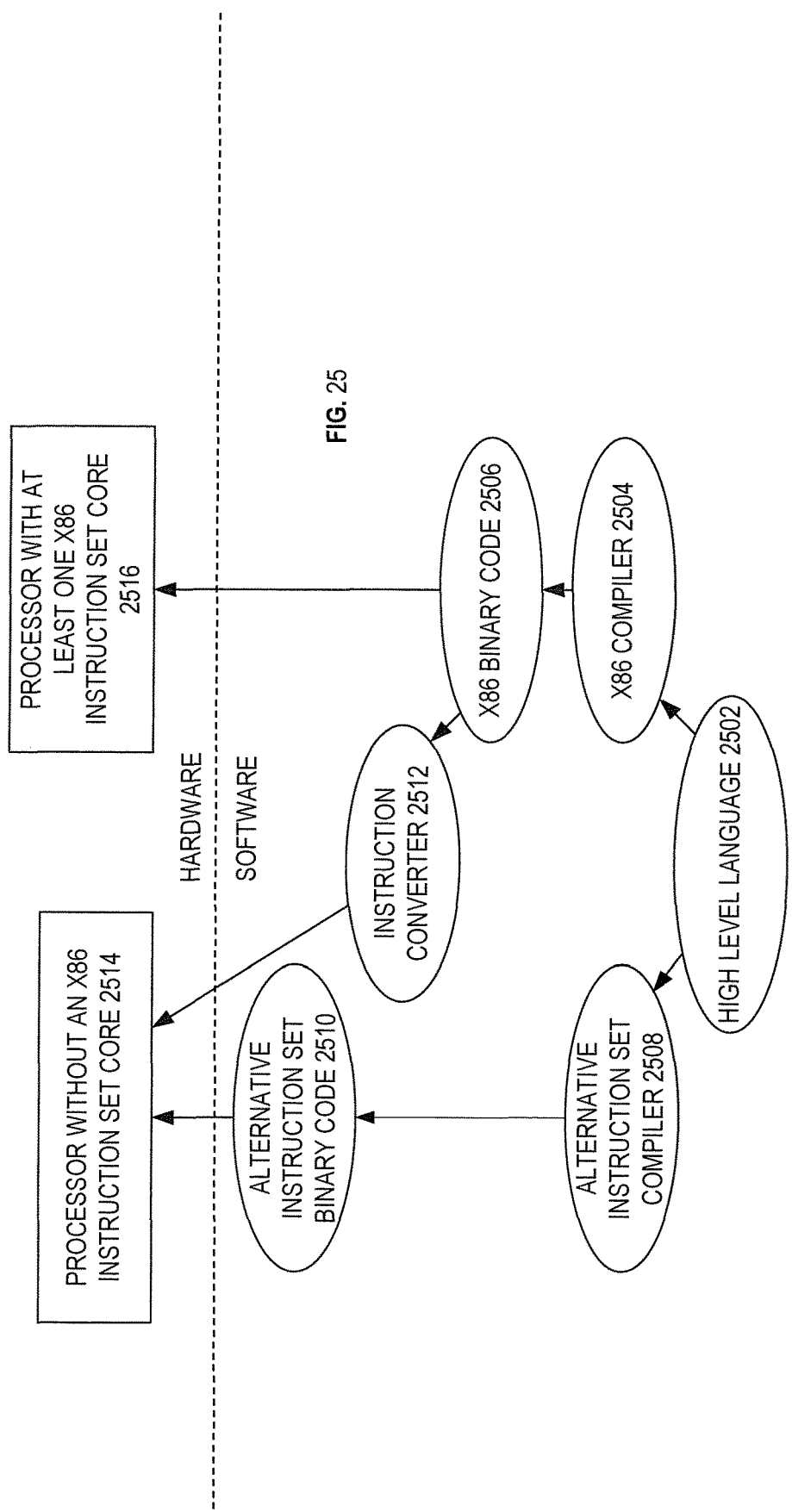

US 9,842,046 B2

PROCESSING MEMORY ACCESS INSTRUCTIONS THAT HAVE DUPLICATE MEMORY INDICES

BACKGROUND

Field

Embodiments relate to processors to execute memory access instructions. In particular, embodiments relate to processors to execute memory access instructions having duplicate memory indices (e.g., gather and scatter instructions).

Background Information

Processors are commonly operable to execute instructions to access memory. For example, processors may execute load instructions to load or read data from memory and/or store instructions to store or write data to memory.

Some processors are operable to execute vector gather instructions. For example, Intel® Advanced Vector Extensions Programming Reference, document reference number 319433-011, published June 2011, describes several vector gather (VGATHER) instructions (e.g., VGATHERDPD, VGATHERQPD, VGATHERDPS, VGATHERQPS, VPGATHERDD, VPGATHERQD, VPGATHERDQ, and VPGATHERQQ). Vector gather instructions are also referred to herein simply as gather instructions. Often, the gather instructions may cause the processor to load or gather multiple data elements indicated by multiple corresponding memory indices and store the gathered data elements as packed data result in a destination storage location.

BRIEF DESCRIPTION OF THE SEVERAL VIEWS OF THE DRAWINGS

The invention may best be understood by referring to the following description and accompanying drawings that are used to illustrate embodiments. In the drawings:

FIG. 3 is a block flow diagram of an embodiment of a method of performing a gather operation in response to a gather instruction.

FIG. 4 is a block diagram illustrating an embodiment of a gather operation that may be performed in response to an embodiment of a gather instruction.

FIG. 5 is a block flow diagram of an embodiment of a method of performing a scatter operation in response to a scatter instruction.

FIG. 6 is a block diagram illustrating an embodiment of a scatter operation that may be performed in response to an embodiment of a scatter instruction.

FIG. 12 shows pseudocode illustrating a particular example embodiment of a method of generating a load mask and broadcast masks that is suitable for the approach shown in FIGS. 10-11.

FIG. 13 is a diagram illustrating a particular example embodiment of a comparison result and generating load and broadcast masks based on the comparison result that is suitable for the approach shown in FIGS. 10-11.

FIG. 16A illustrates an exemplary AVX instruction format including a VEX prefix, real opcode field, Mod R/M byte, SIB byte, displacement field and IMM8.

FIG. 16B illustrates which fields from FIG. 16A make up a full opcode field and a base operation field.

FIG. 16C illustrates which fields from FIG. 16A make up a register index field.

FIG. 17 is a block diagram of a register architecture according to one embodiment of the invention.

FIG. 18A is a block diagram illustrating both an exemplary in-order pipeline and an exemplary register renaming, out-of-order issue/execution pipeline according to embodiments of the invention.

FIG. 18B shows processor core including a front end unit coupled to an execution engine unit, and both are coupled to a memory unit.

FIG. 25 is a block diagram contrasting the use of a software instruction converter to convert binary instructions in a source instruction set to binary instructions in a target instruction set according to embodiments of the invention.

DETAILED DESCRIPTION

Disclosed herein are processors to execute memory access instructions, methods performed by the processors when processing or executing the memory access instructions, and systems incorporating one or more processors to process or execute the memory access instructions. In the following description, numerous specific details are set forth (e.g., specific processor configurations, microarchitectural details, instruction functionalities, data formats, data structures, sets of operations, orders of operations, etc.). However, embodiments may be practiced without these specific details. In other instances, well-known circuits, structures and techniques have not been shown in detail to avoid obscuring the understanding of the description.

Figure 1:
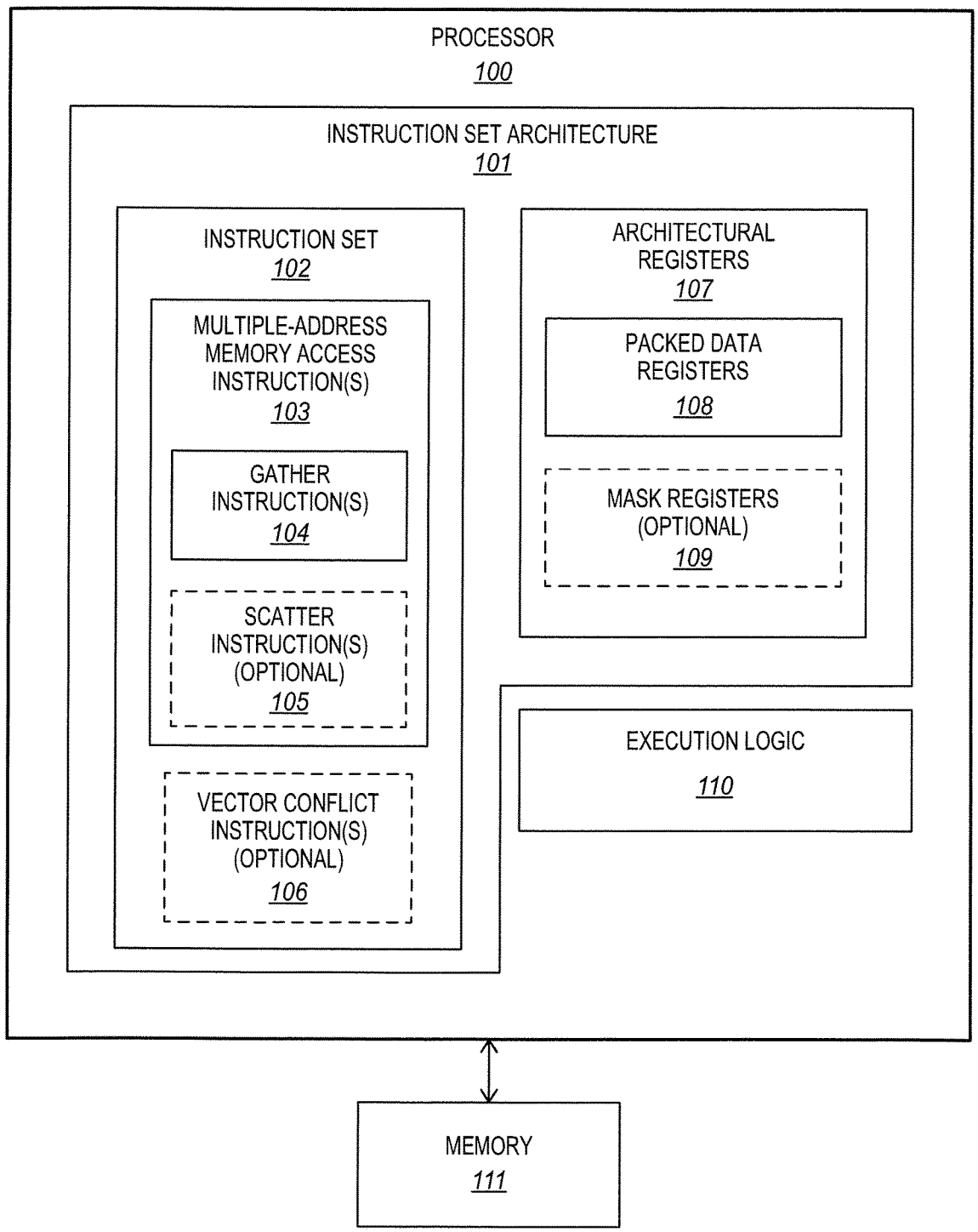
FIG. 1 is a block diagram of an embodiment of a processor having an instruction set that includes one or more multiple-address memory access instruction(s) and a memory coupled with the processor.

FIG. 1 is a block diagram of an embodiment of a processor 100 having an instruction set 102 that includes one or more multiple-address memory access instruction(s) 103 and a memory 111 coupled with the processor. The processor may be any of various complex instruction set computing (CISC) processors, various reduced instruction set computing (RISC) processors, various very long instruction word (VLIW) processors, various hybrids thereof, or other types of processors entirely. In some embodiments, the processor may be a general-purpose processor (e.g., a general-purpose microprocessor of the type used in desktop, laptop, handheld, cellular phone and like computers). Alternatively, the processor may be a special-purpose processor. Examples of suitable special-purpose processors include, but are not limited to, graphics processors, digital signal processors (DSPs), network processors, communications processors, cryptographic processors, and co-processors, to name just a few examples.

The processor has an instruction set architecture (ISA) 101. The ISA represents a part of the architecture of the processor related to programming and includes the native instructions, architectural registers, data types, addressing modes, memory architecture, interrupt and exception handling, and external input and output (I/O) of the processor. The ISA is distinguished from the microarchitecture, which represents the particular design techniques used to implement the ISA.

The ISA includes architecturally-visible registers 107 (e.g., an architectural register file). The architectural registers generally represent on-die processor storage locations. The architectural registers are also referred to herein simply as registers. Unless otherwise specified or apparent, the phrases architectural register, register file, and register are used herein to refer to registers that are visible to the software and/or programmer (e.g., software-visible) and/or the registers that are specified by general-purpose macroinstructions to identify operands. These registers are contrasted to other non-architectural or non-architecturally visible registers in a given microarchitecture (e.g., temporary registers used by instructions, registers inside execution units, reorder buffers, retirement registers, etc.). The illustrated registers include packed data registers 108. Each of the packed data registers is operable to store packed data, vector data, or SIMD data. In some embodiments, the registers may also optionally include packed data operation mask registers 109, also referred to simply as mask registers.

The illustrated ISA includes the instruction set 101 that is supported by the processor. The instructions represent macroinstructions (e.g., instructions provided to the processor for execution), as opposed to microinstructions or micro-ops (e.g., those which result from a decoder decoding macroinstructions). The instruction set includes the one or more multiple-address memory access instruction(s) 103. In some embodiments, these may include one or more gather instruction(s) 104 to read, load, or gather data from the memory 111. In some embodiments, these may optionally include one or more scatter instruction(s) 105 to write, store, or scatter data to the memory 111. Various embodiments of gather and scatter instructions will be disclosed further below. The ISA may include either a single or multiple memory access instructions 103. In some embodiments, the instruction set may also optionally include one or more vector conflict instruction(s) 106 operable to cause the processor to perform comparisons of data elements of packed data. As will be discussed further below, in some embodiments, logic used to implement the vector conflict instruction(s) may also be used to implement one or more of the memory access instruction(s) 103. The instruction set generally includes other instructions not necessary to understand the present description.

The processor also includes execution logic 110. The execution logic is operable to execute or process the instructions of the instruction set (e.g., the multiple-address memory access instruction(s) 103). As will be explained further below, the multiple-address memory access instruction(s) may be operable to cause the processor to access the memory 111 (e.g., load data from the memory and/or store data to the memory).

Figure 2:
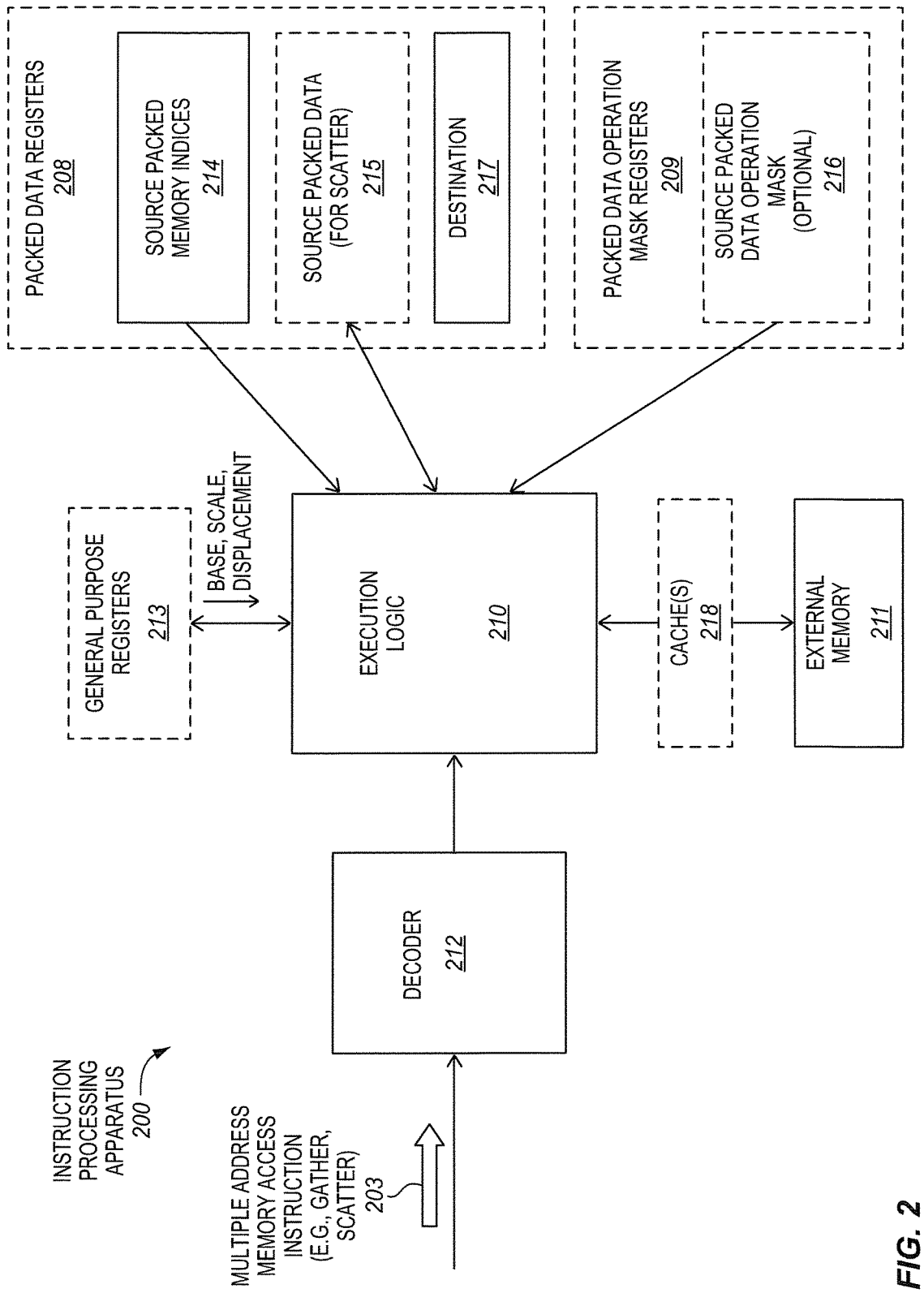
FIG. 2 is a block diagram of an embodiment of a processor or other instruction processing apparatus having an execution logic that is operable to execute a multiple-address memory access instruction.

FIG. 2 is a block diagram of an embodiment of a processor or other instruction processing apparatus 200 having an execution logic 210 that is operable to execute a multiple-address memory access instruction 203. In some embodiments, the instruction processing apparatus 200 may be, or may be included in, the processor 100 of FIG. 1, or one similar. Alternatively, the instruction processing apparatus 200 may be, or may be included in, a different processor. Moreover, the processor 100 of FIG. 1 may include an different instruction processing apparatus than that shown in FIG. 2.

The instruction processing apparatus 200 may receive the multiple-address memory access instruction 203. For example, the instruction may be received from an instruction fetch unit, an instruction queue, a memory, etc. In some embodiments, the instruction may represent a gather instruction or a scatter instruction. As used herein, a gather instruction refers to an instruction that is operable to cause the processor to gather data elements from memory, and does not exclude other operations (e.g., arithmetic or logical operations performed on the gathered data). A scatter instruction refers to an instruction that is operable to cause the processor to scatter data elements to memory, and does not exclude other operations (e.g., arithmetic or logical operations performed on the data scattered).

The instruction processing apparatus includes a set of packed data registers 208. In some embodiments, the instruction processing apparatus may optionally include a set of packed data operation mask registers 209. The registers may represent architectural on-processor (e.g., on-die) processor storage locations. The registers may be implemented in different ways in different microarchitectures using well-known techniques, and are not limited to any particular type of circuit. Various different types of registers are suitable as long as they are capable of storing and providing data as described herein. Examples of suitable types of registers include, but are not limited to, dedicated physical registers, dynamically allocated physical registers using register renaming, and combinations thereof.

The multiple-address memory access instruction may explicitly specify (e.g., through bits or one or more fields) or otherwise indicate (e.g., implicitly indicate) a source 214 of packed memory indices. In the case of a gather instruction/operation, the instruction may indicate a destination 217 where a result packed data elements gathered from memory are to be stored. In the case of a scatter instruction/operation the instruction may indicate a source 215 of packed data elements to be scattered to memory. As shown in the illustrated embodiment, the source 214, the source 215, and the destination 217 may be registers in the packed data registers 208, although this is not required. In other embodiments, other storage locations may be used.

In some embodiments, the instruction 203 may optionally specify or otherwise indicate a source 216 of a packed data operation mask, although this is not required. The packed data operation mask may also be referred to herein simply as a mask. As shown, in some embodiments, the source 216 may be a register in the packed data operation mask registers 209, although this is not required. In other embodiments, the mask may be stored in another storage location or specified by the instruction (e.g., a field or immediate). The mask may represent a predicate operand or conditional control operand to mask, predicate, or conditionally control whether or not memory access operations are to be performed and/or whether or not results of the operations are to be stored.

In some embodiments, the predication may be at per-data element granularity so that different data elements may be predicated or controlled separately and/or independently of others. The mask may include multiple mask elements, predicate elements, or conditional control elements. In one aspect, the elements may be included in a one-to-one correspondence with data elements of a source and/or result packed data. Commonly each mask element may be a single bit. A value of each bit may control whether or not an operation is to be performed and/or whether or not a result of the operation is to be stored. According to one possible convention (the other convention is also possible), each bit may be set (i.e., have binary 1) to allow an operation to be performed and a result to be stored, or cleared (i.e., have binary 0) to either not allow the operation to be performed or not allow a result of the operation to be stored. Alternatively, rather than a single bit, each element may include multiple bits (e.g., a same number of bits as corresponding packed data elements). Other embodiments may optionally be performed without masking or predication.

Referring again to FIG. 2, the illustrated instruction processing apparatus includes an instruction decode unit or decoder 212. The decoder may receive and decode higher-level machine instructions or macroinstructions (e.g., the instruction 203), and output one or more lower-level micro-operations, micro-code entry points, microinstructions, or other lower-level instructions or control signals that reflect and/or are derived from the original higher-level instruction. The one or more lower-level instructions or control signals may implement the operation of the higher-level instruction through one or more lower-level (e.g., circuit-level or hardware-level) operations. The decoder may be implemented using various different mechanisms including, but not limited to, microcode read only memories (ROMs), look-up tables, hardware implementations, programmable logic arrays (PLAs), and other mechanisms known in the art. In other embodiments, instead of having the decoder 212, an instruction emulator, translator, morpher, interpreter, or other instruction conversion logic (e.g., implemented in software, hardware, firmware, or a combination) may be used. In still other embodiments, a combination of instruction conversion logic and a decoder may be used. Some or all of the instruction conversion logic may be located off-die from the rest of the instruction processing apparatus, such as on a separate die or in memory.

Referring again to FIG. 2, the execution logic 210 is coupled with the decoder 212. The execution logic is also coupled with the packed data registers 208 and the packed data operation mask registers 209. The execution logic is operable, in response to and/or as a result of the multiple-address memory access instruction 203 (e.g., in response to one or more control signals derived from the instruction 203) to access the memory 211 (e.g., to gather data from the memory 211 into the destination 217 as a result packed data, or scatter packed data elements of the source 215 to the memory 211). As shown, in some embodiments, one or more optional cache(s) 218 may be logically coupled between the memory and the execution logic. The execution logic and/or the apparatus may include specific or particular logic (e.g., circuitry or other hardware potentially combined with software and/or firmware) operable to execute and/or process the instruction 203 and access the memory in response to the instruction.

To avoid obscuring the description, a simple instruction processing apparatus 200 has been described, although the instruction processing apparatus may optionally include one or more other conventional components. Examples of such conventional components include, but are not limited to, an instruction fetch unit, an instruction scheduling unit, a branch prediction unit, instruction and data caches, instruction and data translation lookaside buffers (TLB), prefetch buffers, microinstruction queues, microinstruction sequencers, bus interface units, a retirement/commit unit, a register renaming unit, and other components conventionally employed in processors. Moreover, embodiments may have multiple cores, logical processors, or execution engines having either the same or different ISA. There are literally numerous different combinations and configurations of such components in processors, and embodiments are not limited to any particular such combination or configuration.

FIG. 3 is a block flow diagram of an embodiment of a method 320 of performing a gather operation in response to a gather instruction. In some embodiments, the method 320 may be performed by the processor 100 of FIG. 1, or the instruction processing apparatus 200 of FIG. 2, or a similar processor or instruction processing apparatus. Alternatively, the method 320 may be performed by different embodiments of processors, instruction processing apparatus, logic devices, or circuits. Moreover, the processor 100, and the instruction processing apparatus 200, may perform embodiments of operations and methods the same as, similar to, or different than those of the method 320.

At block 321, a gather instruction is received. In various aspects, the gather instruction may be received at a processor, an instruction processing apparatus, or a portion thereof (e.g., a decoder, instruction converter, etc.). In various aspects, the instruction may be received from an off-processor source (e.g., from a main memory, a disc, or a bus or interconnect), or from an on-processor source (e.g., from an instruction cache). In some embodiments, the gather instruction specifies or otherwise indicates a first source of a plurality of packed memory indices, a second source of a packed data operation mask, and a destination (e.g., a destination storage location).

At block 322, a packed data result is stored in a destination (e.g., a destination storage location) in response to the gather instruction. In some embodiments, the packed data result may have data elements gathered from memory locations indicated by corresponding memory indices (of the first source of the packed memory indices) when not blocked by corresponding elements of the packed data operation mask (e.g., when the corresponding mask bits are not binary 0).

The method 320 is shown in a basic form, although additional operations may optionally be added to the method. By way of example, the gather instruction may be fetched and decoded. The packed memory indices and packed data operation mask may be accessed and/or received. Execution logic may be enabled to perform the gather operation specified by the gather instruction and may perform the gather operation. Moreover, various microarchitectural operations within the execution logic while performing the gather operation may be performed. For example, any of the operations discussed below for FIGS. 7-13 may be performed as part of this method.

FIG. 4 is a block diagram illustrating an embodiment of a gather operation 424 that may be performed in response to an embodiment of a gather instruction. The gather instruction may specify or otherwise indicate a first source of a plurality of packed memory indices 414 and a second source of a packed data operation mask 416. The illustrated embodiment shows eight packed memory indices and eight corresponding mask elements (e.g., bits) in the packed data operation mask, although the scope of the invention is not so limited. Other embodiments may include either fewer or more memory indices and corresponding mask elements/bits. In various embodiments, the memory indices may be 16-bit words, 32-bit doublewords, or 64-bit quadwords, or other sized data elements. In various embodiments, the width of the packed memory indices operand may be 64-bits, 128-bits, 256-bits, 512-bits, 1024-bits, or other widths.

In the illustrated embodiment, the source packed indices are, from left to right, 134, 231, 20, 134, 5, 20, 20, and 5. In this document, the convention is followed that most significant bit positions are shown on the left and least significant bit positions are shown on the right. Notice that some of the indices are duplicates in that they have the same value. For example, the memory index 134 appears twice in the positions (counting from the right) 4 and 7. Similarly, the memory index 20 appears three times in the positions (counting from the right) 1, 2, and 5. Likewise, the memory index 5 appears twice in the positions (counting from the right) 0 and 3. In the illustrated example, the mask bits are, from left to right, 11011101. Each mask bit corresponds to a memory index in a corresponding position (in the illustration the corresponding positions are in vertically alignment one above the other).

The embodiment of a gather operation 424 is performed in response to the embodiment of the gather instruction. The gather operation gathers data elements (D1, D2, D3, and D4) 425 from memory locations in a memory 411 that are indicated by the source packed memory indices 414. Each unique memory index points to a unique memory location and therefore a potentially unique data element, but the same memory indices point to the same memory location and therefore the same data element. In the illustrated example, memory index 5 points to a memory location storing data element D1, memory index 20 points to a memory location storing data element D2, memory index 134 points to a memory location storing data element D3, and memory index 231 points to a memory location storing data element D4. A packed data result is stored in a destination (e.g., a destination storage location) specified or otherwise indicated by the gather instruction. In the illustrated example, the packed data result includes, from left to right, the data elements D3, D4, *, D3, D1, D2, *, and D1. The gathered data elements D1, D2, D3, and D4 are stored in the destination in data elements where the corresponding mask bit is set (i.e., 1).

Asterisk (*) are shown in destination data element positions where the corresponding mask bits are cleared (i.e., 0). In some embodiments, merging-masking may be performed. In merging-masking, when a given destination data element is masked out, the initial or pre-existing value of the data element in the destination storage location may be preserved unchanged (i.e., not be updated with a result of the operation of the instruction). In other embodiments, zeroing-masking may be performed. In zeroing-masking, when a given destination data element is masked out, the corresponding given destination data element may be zeroed out or a value of zero may be stored in the corresponding given destination data element. Alternatively, other predetermined values may be stored in the masked out destination data elements. Accordingly, in various embodiments, the data element positions indicated by the asterisks (*) may have zeroed out values, or the values of data elements initially in the destination storage location prior to the gather operation.

To further illustrate, consider one particular detailed example embodiment of a gather instruction/operation. The gather operation/instruction may gather single precision or double precision floating point data from memory using signed doubleword or quadword indices in a source packed indices indicated by the instruction. The gather operation/instruction may use a packed data operation mask for predication and may use 128-bit, 256-bit, or 512-bit operands. The memory indices may be multiplied (e.g., shifted) by a scale and added to a base plus a displacement to generate virtual addresses for the memory locations. The gathered elements may be stored in a destination packed data register specified by the gather instruction. Data may only be gathered if the corresponding mask bit in the packed data operation mask is set to one. If an elements mask bit is cleared, the corresponding element of the destination packed data register may be unchanged. When data is gathered the corresponding mask bits may be cleared to zero. This is just one example embodiment. Other embodiments of gather instructions/operations are contemplated.

FIG. 5 is a block flow diagram of an embodiment of a method 530 of performing a scatter operation in response to a scatter instruction. In some embodiments, the method 530 may be performed by the processor 100 of FIG. 1, or the instruction processing apparatus 200 of FIG. 2, or a similar processor or instruction processing apparatus. Alternatively, the method 530 may be performed by different embodiments of processors, instruction processing apparatus, logic devices, or circuits. Moreover, the processor 100, and the instruction processing apparatus 200, may perform embodiments of operations and methods the same as, similar to, or different than those of the method 530.

At block 531, a scatter instruction is received. The instruction may be received similarly as other instructions described herein. In some embodiments, the scatter instruction may specify or otherwise indicate a first source of a plurality of packed memory indices, a second source of a plurality of corresponding packed data elements, and a third source of a packed data operation mask.

At block 532, in response to the scatter instruction, packed data elements of the second source may be scattered, written, or otherwise stored to memory locations indicated by corresponding memory indices (of the first source of the packed memory indices) when not blocked by corresponding elements of the packed data operation mask (e.g., when the corresponding mask bits are not binary 0).

The method 530 is shown in a basic form, although additional operations may optionally be added to the method. By way of example, the scatter instruction may be fetched and decoded. The packed memory indices, packed data elements, and packed data operation mask may be accessed and/or received. Execution logic may be enabled to perform the scatter operation specified by the scatter instruction and may perform the scatter operation. Moreover, various micro-architectural operations within the execution logic while performing the scatter operation may be performed (e.g., memory indices may be compared, accesses may be performed once per index, etc.).

FIG. 6 is a block diagram illustrating an embodiment of a scatter operation 634 that may be performed in response to an embodiment of a scatter instruction. The scatter instruction specifies or otherwise indicates a first source of a plurality of packed memory indices 614, a second source of a plurality of packed data elements 615 to be scattered, and a third source of a packed data operation mask 616. In this particular example, there are eight memory indices, eight corresponding packed data elements to scatter, and eight corresponding mask elements/bits, although the scope of the invention is not so limited. Other embodiments may include either fewer or more indices, data elements, and mask bits. In various embodiments, the memory indices may be 16-bit words, 32-bit doublewords, or 64-bit quadwords, or other sized memory indices. In various embodiments, the data elements may be 16-bit words, 32-bit doublewords, or 64-bit quadwords, or other sized data elements. It is not required that the indices and data elements have the same widths as one another. In various embodiments, the width of the packed memory indices operand may be 64-bits, 128-bits, 256-bits, 512-bits, 1024-bits, or other widths.

In the illustrated embodiment, the source packed indices are, from left to right, 134, 231, 20, 134, 5, 20, 20, and 5. Notice that some of the indices are duplicates in that they have the same value. In the illustrated example, the mask bits are, from left to right, 11011101. Each mask bit corresponds to a memory index in a corresponding position (in the illustration the corresponding positions are in vertically alignment one above the other). In the illustrated example, the source packed data elements are, from left to right, D8, D7, D6, D5, D4, D3, D2, and D1.

The embodiment of a scatter operation 634 is performed in response to the embodiment of the scatter instruction. The scatter operation scatters packed data elements 615 (i.e., D1-D8) to memory locations in a memory 611 indicated by the corresponding memory indices 614. The scatter operation is ordered across the packed memory indices. According to the illustrated convention, the ordering of the scattering proceeds from right to left (i.e., scattering is performed first with memory index 5, followed by index 20, followed by index 20, followed by index 5, followed by index 134, followed by index 20, followed by index 231, and finally by index 134).

In the illustrated example, the memory location indicated by the index 5 stores data element D4, the memory location indicated by the index 20 stores data element D3, the memory location indicated by the index 134 stores data element D8, and the memory location indicated by the index 231 stores data element D7. Proceeding from right to left through the memory indices, the first time memory index 5 is encountered, D1 may be written to its corresponding memory location, but then the next time memory index 5 is encountered further to the left, D4 may be written over D1 in this memory location. Similarly, the first time memory index 20 is encountered, D2 will not be written because of the zero in the corresponding position of the packed data operation mask, the next time the memory index 20 is encountered further to the left D3 may be written to the corresponding memory location, and then the next time the memory index 20 is encountered further to the left (in position five) D3 will not be overwritten with D6 because of the zero in the corresponding position of the packed data operation mask. Similarly, the first time memory index 134 is encountered, D5 may be written to the memory location corresponding to memory index 134, but then the next time the memory index 134 is encountered further to the left, D8 may be written over D5 in this memory location.

To further illustrate, consider one particular detailed example embodiment of a scatter instruction/operation. The scatter instruction/operation may scatter doubleword or quadword data to memory locations in a memory using signed doubleword or quadword indices in a packed memory indices operand indicated by the instruction. The scatter instruction/operation may use a packed data operation mask for predication and may use 128-bit, 256-bit, or 512-bit operands. The indices may be multiplied (e.g., shifted) by a scale and added to a base plus a displacement to generate virtual addresses. The elements to be scattered may be stored in a packed data operand indicated by the instruction. Data elements may only be scattered if their corresponding mask bit in the packed data operation mask is set to one. If a data elements corresponding mask bit is not set, then the corresponding element of the source packed data register may not be scattered to memory. When data is scattered the corresponding mask bits may be cleared to zero. This is just one example embodiment. Other embodiments of gather instructions/operations are contemplated.

As previously mentioned, memory access instructions (e.g., gather instructions, scatter instructions, etc.) may have duplicate memory indexes. For example, an instruction may have a set of memory indices 134, 231, 20, 134, 5, 20, 20, 5, where the memory indices 134, 20, and 5 all have duplicates. The duplicate memory indices access the same data in the same memory location. By way of example, a memory index may be converted into a memory address using a common scale and a common base (e.g., as memory address=memory index*scale+base). In some cases, a displacement may also be used. In any event, the same memory index may access the same memory location, since the scale, base, and displacement may all be fixed parameters for each of the indices.

One possible way of processing a memory access instruction having duplicate indices is to simply process each memory index individually and independently of the others irrespective of whether or not it is a duplicate. For example, each memory index may be separately converted into a memory address (e.g., as memory address=memory index*scale+base) and then a separate load operation (e.g., a load microinstruction or other control signal) may be performed using the generated memory address to load data from memory. This approach effectively treats duplicate and non-duplicate indices the same inasmuch as it does not attempt to recognize duplicate memory indices and does not do fewer loads for duplicate indices than for non-duplicate indices. However, there are a number of potential drawbacks with this approach. One potential drawback is that multiple unnecessary load operations may tend to waste bandwidth (e.g., bus or interconnect), power, and/or time. For example, unnecessarily accessing the same memory location multiple times may tend to unnecessarily waste memory bandwidth. Even if the data is stored in a cache after the first access, subsequent unnecessarily accesses to the cache may tend to waste power. Another potential drawback is it may tend to inefficiently use translation lookaside buffer (TLB) entries, tag array entries, or other processor structures or resources.

In some embodiments, duplicated or replicated memory indices of a memory access instruction may be identified. In some embodiments, the duplicated or replicated memory indices may be identified by comparing the memory indices with one another. In some embodiments, data corresponding to each identified set of duplicated or replicated memory indices may be loaded only once (e.g., from memory or a cache). In some embodiments, data loaded for an identified set of duplicated or replicated memory indices may be broadcast or replicated to each of the replicated or duplicated memory indices. Advantageously, such an approach for processing duplicated or replicated memory indices may potentially help to conserve bandwidth (e.g., of a bus or interconnect), may potentially help to increase the efficiency of utilization of processor structures or resources (e.g., TLB entries, tag array entries, etc.), may help to reduce power consumption (e.g., by reducing cache accesses), and/or may help to eliminate unnecessary load operations (e.g., load micro-ops).

Figure 7:
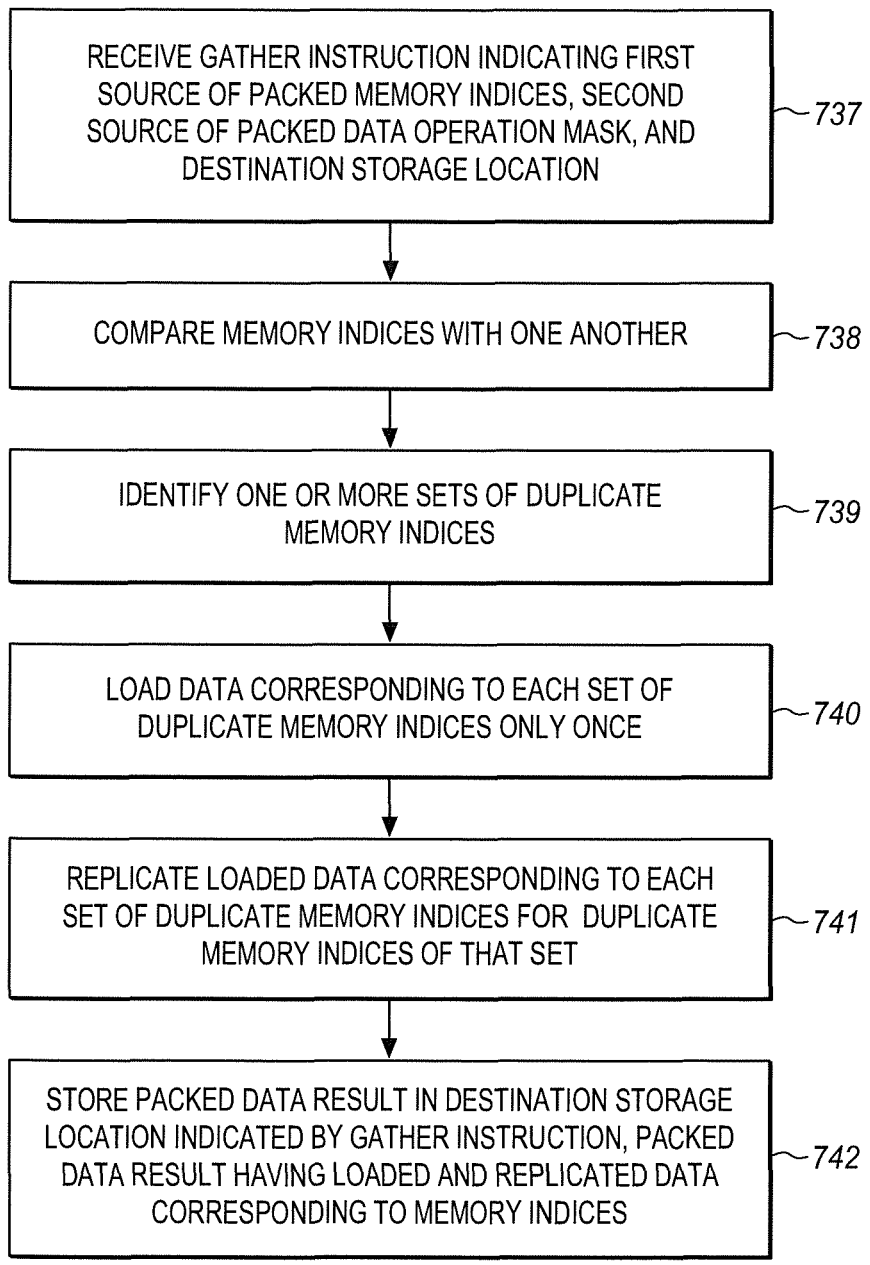
FIG. 7 is a block flow diagram of an embodiment of a method of gathering data in response to a gather instruction.

FIG. 7 is a block flow diagram of an embodiment of a method 736 of gathering data in response to a gather instruction. In some embodiments, the method may be performed by a processor (e.g., processor 100) or an instruction processing apparatus (e.g., apparatus 200).

At block 737, the gather instruction is received. The gather instruction specifies or otherwise indicates a first source of packed memory indices, optionally specifies or otherwise indicates an optional second source of a packed data operation mask, and specifies or otherwise indicates a destination storage location. In various aspects, the instruction may be received at a processor, an instruction processing apparatus, or a portion thereof (e.g., a decoder, instruction converter, etc.). In various aspects, the instruction may be received from an off-processor source (e.g., from a main memory, a disc, or a bus or interconnect), or from an on-processor source (e.g., from an instruction cache).

At block 738, the packed memory indices are compared with one another. In some embodiments, the comparison may progress serially from a first end of the packed memory indices to a second end of the packed memory indices (e.g., from a least significant end to a most significant end). Each memory index may be selected in sequence and compared with all other indexes between itself and the second end (e.g., all other more significant memory indices). In other embodiments, the comparison may be performed concurrently or in parallel for all memory indices. For example, each memory index may be concurrently compared with all other indexes between itself and the second end (e.g., all other more significant memory indices). Notice that it is not required to compare each memory index with all other memory indexes, but rather it may be sufficient to compare each memory index with all other memory indexes between itself and a given end (e.g., a more significant end according to one possible convention).

At block 739, one or more sets of duplicate memory indices are identified or determined. The duplicate or replicate memory indices have the same value. By way of example, each memory index may be a 16-bit, a 32-bit, a 64-bit, or some other sized data element. When all corresponding bits of two memory indices are identical the memory indices are duplicates of one another. For example, the 16-bit memory index "1110001010001011" is a duplicate of the 16-bit memory index "1110001010001011."

At block 740, data corresponding to each set of duplicated or replicated memory indices is loaded only once. For example, a single memory index of the identified set of duplicate memory indices may be converted into a memory address (e.g., as memory address=memory index*scale+base), and then a single load operation (e.g., a load micro-op) may be performed to load data from a memory location indicated by the generated memory address.

At block 741, the loaded data corresponding to the identified set of duplicate memory addresses may be broadcast or otherwise replicated for each of the duplicated or replicated memory indices of that set. For example, if there are three duplicate memory indices all with the same value in a given set then the loaded data may be broadcast or replicated three times, once for each of the replicated memory indices in the set.

At block 742, a packed data result may be stored in a destination storage location indicated by the received gather instruction. The packed data result may have the loaded and replicated data corresponding to the memory indices. The loaded and replicated data may be positioned in data element positions of the destination storage location that correspond in position to the position of the memory indices in the packed memory indices.

Figure 8:
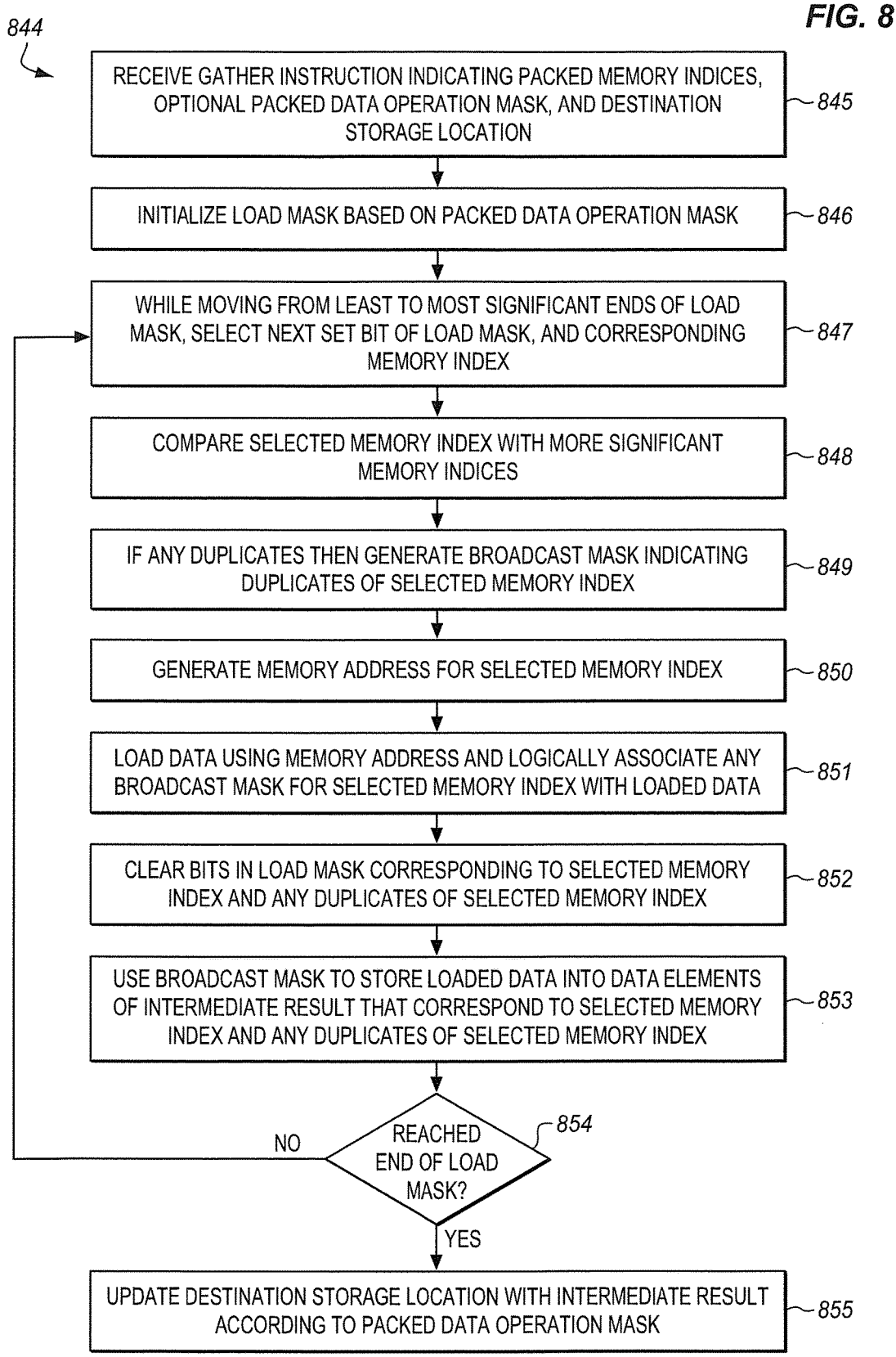
FIG. 8 is a block diagram of a first detailed embodiment of a method of performing a gather operation in response to a gather instruction in which comparison of memory indices is performed within a data load loop.
Figure 9:
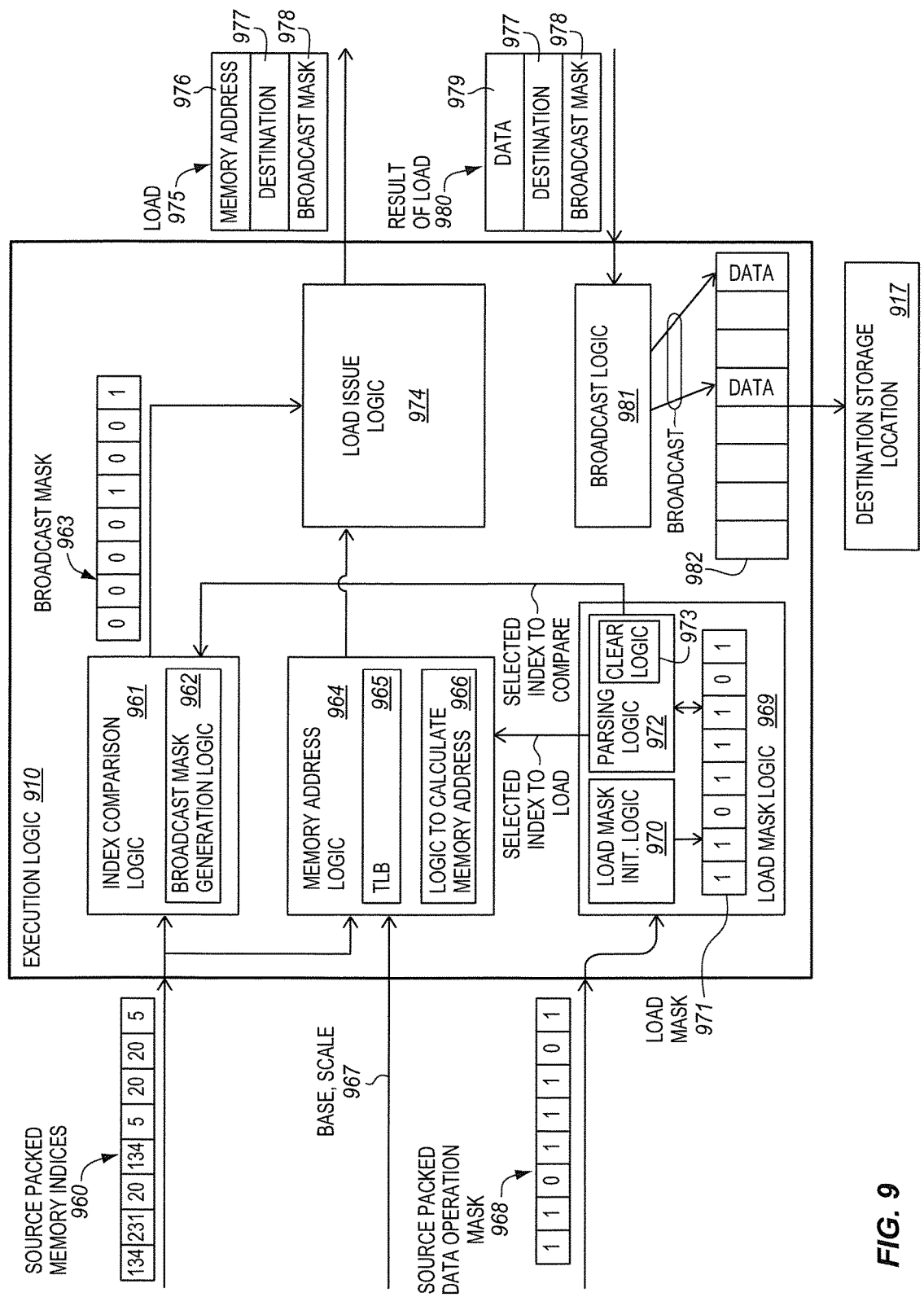
FIG. 9 is a block diagram of a first detailed embodiment of execution logic to perform a gather operation in response to a gather instruction (e.g., in response to a gather instruction being decoded).

FIG. 8 is a block diagram of a first detailed embodiment of a method 844 of performing a gather operation in response to a gather instruction in which comparison of memory indices is performed within a data load loop. FIG. 9 is a block diagram of a first detailed embodiment of execution logic 910 to perform a gather operation in response to a gather instruction (e.g., in response to a gather instruction being decoded). In some embodiments, the execution logic may represent logic (e.g., a finite state machine) of a memory execution cluster or memory subsystem of a processor. To better illustrate certain concepts, the method 844 of FIG. 8 with be described in conjunction with the execution logic 910 of FIG. 9. However, it is to be appreciated that the method 844 may be performed by execution logic entirely different than the execution logic 910 and that the execution logic 910 can perform methods entirely different than the method 844.

Referring to FIG. 8, at block 845, the gather instruction is received. The gather instruction specifies or otherwise indicates a first source of a packed memory indices, an optional second source of a packed data operation mask, and a destination storage location. For example, as shown in FIG. 9, the source packed memory indices 960 and the optional source packed data operation mask 968 may be provided to the execution logic. In the illustrated embodiment, the example values of the source packed memory indices are, from most significant end to least significant end, 134, 231, 20, 134, 5, 20, 20, 5. As mentioned, each of these values may be a separate 16-bit, 32-bit, or 64-bit data element, for example. In the illustrated embodiment, the example values of the source packed data operation mask are, from most significant end to least significant end, 11011101. Each of these 8-bits corresponds to one of the memory indices in a relative corresponding position. In other embodiments, there may be either fewer or more memory indices and correspondingly fewer or more packed data operation mask bits. In one particular example embodiment, the gather instruction may indicate first 512-bit source operand having eight 64-bit memory indices and may be used to gather eight 64-bit data elements from memory into a 512-bit destination operand, although the scope of the invention is not so limited.

Referring to FIG. 8, at block 846, a load mask may be initialized based on the indicated packed data operation mask. In some embodiments, the load mask may be set equal to the packed data operation mask. For example, as shown in FIG. 9, the source packed data operation mask 968 may be provided to load mask logic 971. The load mask logic includes load mask initialization logic 970 that is operable to initialize a load mask 971 based on the packed data operation mask. In the illustrated embodiment, the load mask is also an 8-bit mask and is set equal to the 8-bit packed data operation mask, although the scope of the invention is not so limited.

Referring to FIG. 8, at block 847, while moving from least to most significant ends of the load mask, the next set bit of the load mask and the corresponding memory index (i.e., in a corresponding position) may be selected. For example, as shown in FIG. 9, the load mask logic 969 includes load mask parsing logic 972 that is operable to parse the load mask from a least significant end (on the right in the illustration) to a most significant end (on the left in the illustration). Initially, the parsing logic may select the rightmost first set bit, which is the first bit in this case. The parsing logic may communicate the selected load mask bit, which corresponds to a selected index to compare, to index comparison logic 961.

Refer again to block 847 of FIG. 8. In the illustrated embodiment, progression occurs from least to most significant ends of the load mask, although this is not required. In other embodiments, the progression may proceed from most to least significant ends, or may be according to another desired order. Moreover, in the illustrated embodiment, a set bit represents an active element of the load mask that is to be processed, although in another embodiments a cleared bit may be used instead as the active element to be processed, or two or more bits having a predetermined value be used as the active element to be processed according to an arbitrary predetermined convention.

At block 848, the selected memory index is compared with all more significant memory indices. For example, as shown in FIG. 9, the index comparison logic may compare the currently selected memory index, which in this example is presently the least significant memory index (the rightmost memory index in the illustration) having a value of 5, with all other more significant memory indexes (to its left in the illustration). Notice that the presently selected memory index in position zero (having a value 5) is a duplicate with the memory index in position three (also having a value 5). In some embodiments, a comparator may be added to execution logic conventionally used to implement gather instructions.

In some embodiments, the comparison may be made based on the memory indices as they exist in the source packed memory indices operand. This is as opposed to a comparison of memory addresses that have been generated from the memory indices (e.g., as index*scale+base). The memory indices can be compared directly without calculation which is fast and efficient, whereas the comparing the memory addresses takes additional time and adds complexity to the implementation. Moreover, since duplicate memory indexes generate duplicate addresses (e.g., since the scale and base are common to all memory indices) it is sufficient to compare the memory indices directly to spot duplicates.

Referring to FIG. 8, at block 849, if the comparison indicates that one or more of the more significant memory indices are duplicates of the selected memory index, then a broadcast mask may be generated that indicates which of the more significant memory indices are duplicates of the selected memory index. For example, as shown in FIG. 9, the index comparison logic includes broadcast mask generation logic 962 to generate a broadcast mask 963 that indicates that the memory index in position three is a duplicate with the presently selected memory index in position zero. In the illustrated embodiment, the broadcast mask is an 8-bit mask, having one bit per memory index in the source packed memory indices 960, and has the example value 00001001. The set bits in positions zero and three indicate that the corresponding memory indices in positions zero and three are duplicates.

It has been described above that the comparison of the selected memory index is with all more significant memory indices, and that the broadcast mask indicates which of the more significant memory indices are duplicates with the selected memory index. In other embodiments, the comparison of the selected memory index may instead be with all less significant memory indices, and the broadcast mask may instead indicate which of the less significant memory indices are duplicates with the selected memory index. Other more elaborate conventions are also possible if desired to compare a selected memory index with other not yet processed/loaded memory indices.

Referring to FIG. 8, at block 850, a memory address (e.g., a virtual memory address) may be generated for the selected memory index. This may be done in a conventional way. In some embodiments, the memory address may be generated by applying a scale and a base to the index (e.g., as memory address=selected index*scale+base). In other embodiments the memory address may be generated differently (e.g., using a displacement, etc.). For example, as shown in FIG. 9, memory address logic 964 may generate a memory address using the selected memory index. By way of example, the load mask logic may provide an indication of an index to load, based on its parsing of the load mask, to the memory address logic. The memory address logic may check a translation lookaside buffer (TLB) 965. The TLB's purpose is to quickly translate a virtual address to a physical address. If an address is not in the TLB, then hardware may attempt to find it (e.g., by walking page tables). If the page tables indicate that the virtual address does not have a physical address, then hardware may signal the OS to page into memory (read it from disk). Shortly thereafter the page may be in physical memory and the translation may be put into the TLB. Logic to calculate the memory address 966 may calculate the memory address. By way of example, the logic may calculate the memory address as index*scale+base. The base and scale 967 may be provided to the execution logic. In one aspect, the base and scale may be provided to the execution logic from integer execution logic.

Referring to FIG. 8, at block 851, data may be loaded using the generated memory address, and in some embodiments any broadcast mask generated for the selected memory index may be logically associated with the loaded data. Logically associating the broadcast mask with the loaded data basically ties the loaded data with the broadcast mask. In some embodiments, the broadcast mask may be sent along with a load operation and returned with a result of the load operation. Alternatively, they may be logically associated in different ways. For example, as shown in FIG. 9, the memory address logic 964 is coupled with load issue logic 974. The load issue logic may receive the memory address and issue a load 975 (e.g., a load micro-op or other load operation) of the data. As shown, in some embodiments, the load may include the generated memory address 976 (e.g., a virtual memory address of index*scale+base), an indication of the destination storage location 977 (e.g., a destination vector register indicated by the gather instruction), and in some embodiments the generated broadcast mask 978. Providing the broadcast mask with the load is one way of allowing logically associating the broadcast mask with the loaded data. The broadcast mask is used to indicate to which data elements the returned loaded data is to be broadcasted or copied to. In some embodiments, such as if the processor has two or more load ports, then two more loads may optionally be performed concurrently (e.g., within the same clock cycle(s) in order to help increase performance). In embodiments, each of these loads may be for a different unique memory index.

Referring to FIG. 8, at block 852, bits (or other active elements) in the load mask corresponding to the selected memory index and any duplicates of the selected memory index may be cleared (or otherwise deactivated). For example, as shown in FIG. 9, clear logic 973 may clear bits in the load mask 971. In this particular example, since the broadcast mask for the selected memory index was 00001001, the clear logic may clear the bits in the load mask in position zero and position three. Prior to the clear operation the load mask may have the bits 11011101, whereas after the clear operation the load mask may have the bits 11010100. As will be described further below, since the loaded data for the presently selected memory index at position zero will be replicated for the memory index at position three, there will be no reason to perform a separate or additional unnecessary load for the memory index at position three. The clearing of the bits for the duplicates in the load mask is one way of accounting for this and avoiding unnecessary loads.

Referring to FIG. 8, at block 853, the broadcast mask is used to store the loaded data into data elements of an intermediate result that correspond in position to the selected memory index and any duplicates of the selected memory index. For example, as shown in FIG. 9, a result of the load may be returned to the execution logic 910. As shown, in some embodiments, the result of the load may include data 979 loaded from the memory location indicated by the memory address, an indication of the destination storage location 977, and the generated broadcast mask 978. The result of the load may be provided to broadcast logic 981. The broadcast logic may broadcast, replicate, or otherwise store the loaded data to data elements of an intermediate result 982 that correspond in position to the selected memory index (in the present example the memory index at position zero) and any duplicates of the selected memory index (in the present example the memory index at position three). As shown, after the broadcast, the intermediate result may have copies of the loaded data at positions zero and three.

In some embodiments within processors that have load with broadcast capability (e.g., to load a data element and broadcast the data element into multiple data elements of a vector register) the existing broadcast logic may be reutilized for this purpose rather than including additional broadcast logic. The broadcast mask may be used to update of anywhere from at least two to potentially all of the data elements of the destination storage location depending upon the number of duplicates for the presently selected memory index. Conventionally, there would be no broadcast mask and a loaded data would only update a single data element corresponding to its memory index.

Referring to FIG. 8, at block 854, a determination is made whether the end of the load mask has been reached. In some embodiments, this may represent a determination of whether the presently selected bit of the load mask is the most significant bit of the load mask. In other embodiments, this may represent a determination of whether there are any more set bits (or other active elements) in the load mask (e.g., while moving from the least to most significant ends). If it is determined that the end of the load mask has not been reached (i.e., "no" is the determination at block 854), the method may revisit block 847, where the method may attempt to seek another set bit or other active element of the load mask and generally repeat the aforementioned operations. Alternatively, if it is determined that the end of the load mask has been reached (i.e., "yes" is the determination at block 854), the method may advance to block 855.

For example, as shown in FIG. 9, in the present example the least significant bit of the load mask has been described as being processed. Accordingly, the load mask parsing logic may parse the load mask and determine that the bit in position two (the third bit from the right in the illustration) is also set. This bit may be processed substantially analogously as previously described, and so on until there are no more set bits in the load mask. In the present example, the overall operation may be load data for the memory index value of 5 once and broadcast the loaded data to positions 0 and 3, load data for the memory index value of 20 once and store the loaded data to positions 2 (other positions masked out), load data for the memory index value of 134 once and broadcast the loaded data to positions 4 and 7, and load data for the memory index value of 231 once and store the data only to position 6 since there are no duplicates. It is noted that the bits set in the load mask will be cleared in conjunction with the broadcasts such that the next time the load mask is parsed these bits will be cleared. The gather scatter will skip over these bits cleared for the duplicate indices and correspondingly skip over the unnecessary load operations. This may help to provide the power, resource utilization, time, and or other advantages previously described.

Referring to FIG. 8, at block 855, the destination storage location indicated by the received gather instruction may be updated with the intermediate result according to the packed data operation mask indicated by the gather instruction. For example, as shown in FIG. 9, after progression of the method has proceeded to completion, the destination storage location 917 may be updated with the now complete intermediate result 982 according to the received packed data operation mask 968. For example, in some embodiments, the intermediate result may be used to update the destination storage location using merging masking or zeroing masking as described elsewhere herein. The execution logic may also monitor how many loads it has issued and how many have been returned from the memory subsystem (e.g., memory, caches, etc.). When the last issued load is returned, the execution logic may signal (e.g., a vector unit) that the operation is complete. The vector unit may then merge the intermediate result from the execution logic with the existing values in the destination storage location (e.g., a vector register) and may in some embodiments clear the corresponding indicated packed data operation mask (e.g., the indicated mask register) to indicate the gather instruction has executed successfully.

An advantage of the approach shown and described for FIGS. 8-9 is that the comparison may be performed by comparison logic incorporated into the execution logic conventionally used to implement gather instructions, and may not significantly impact other portions of the processor. In the approach shown and described for FIGS. 8-9, the comparison of the memory indices is in the path of the decision loop of the execution logic. For example, after a memory index has been selected to process, the execution logic does the comparison with the other memory indices to find out which if any of the other memory indices are duplicates, clear bits for those duplicate memory indices in the load mask, and then choose the next set bit in the load mask. As a result, this approach may tend to slightly increase the timing of the operation, slightly extend the pipeline, and/or slightly increase the latency of the gather operation.

Figure 10:
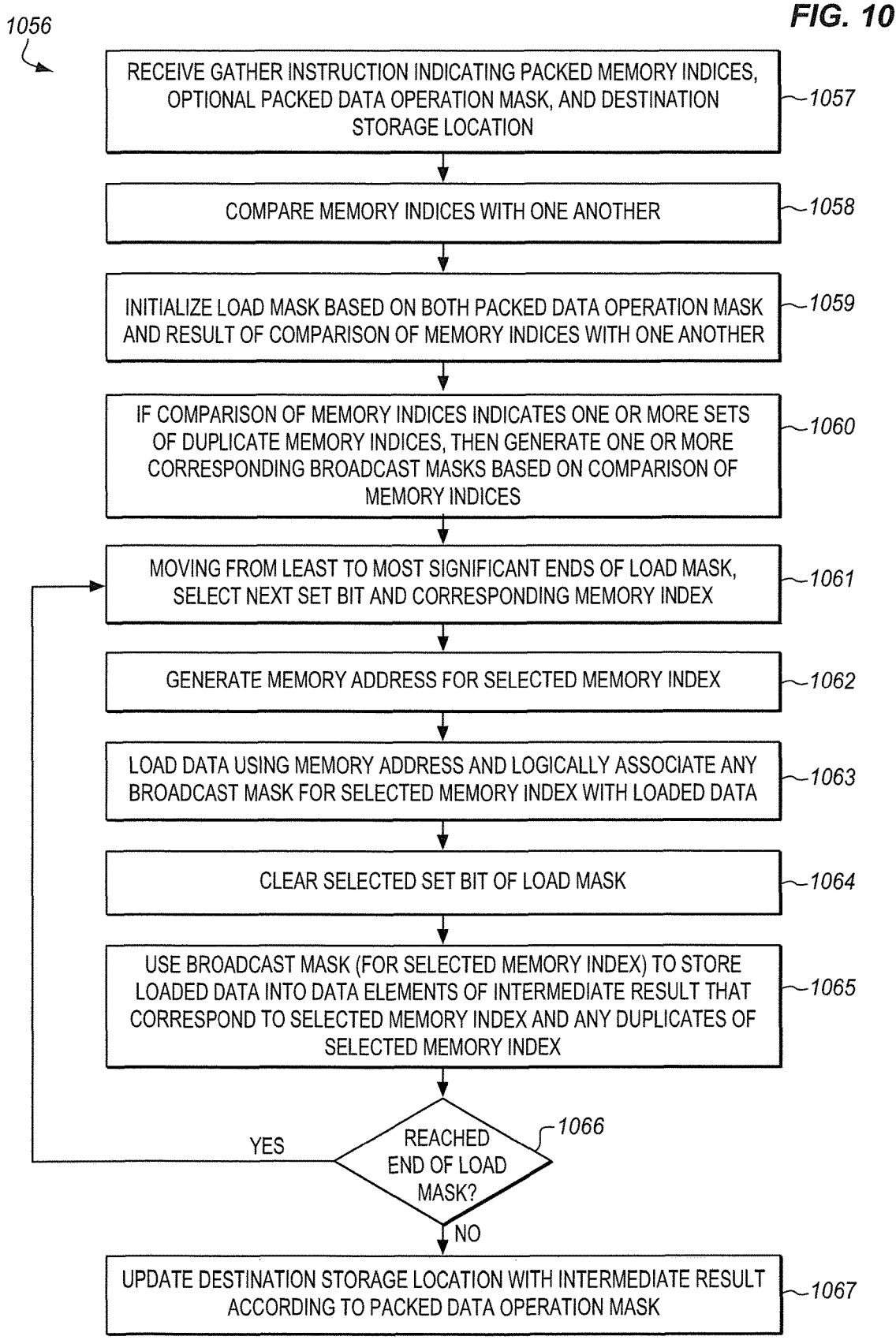
FIG. 10 is a block diagram of a second detailed embodiment of a method of performing a gather operation in response to a gather instruction in which memory indices are compared outside of a load loop.
Figure 11:
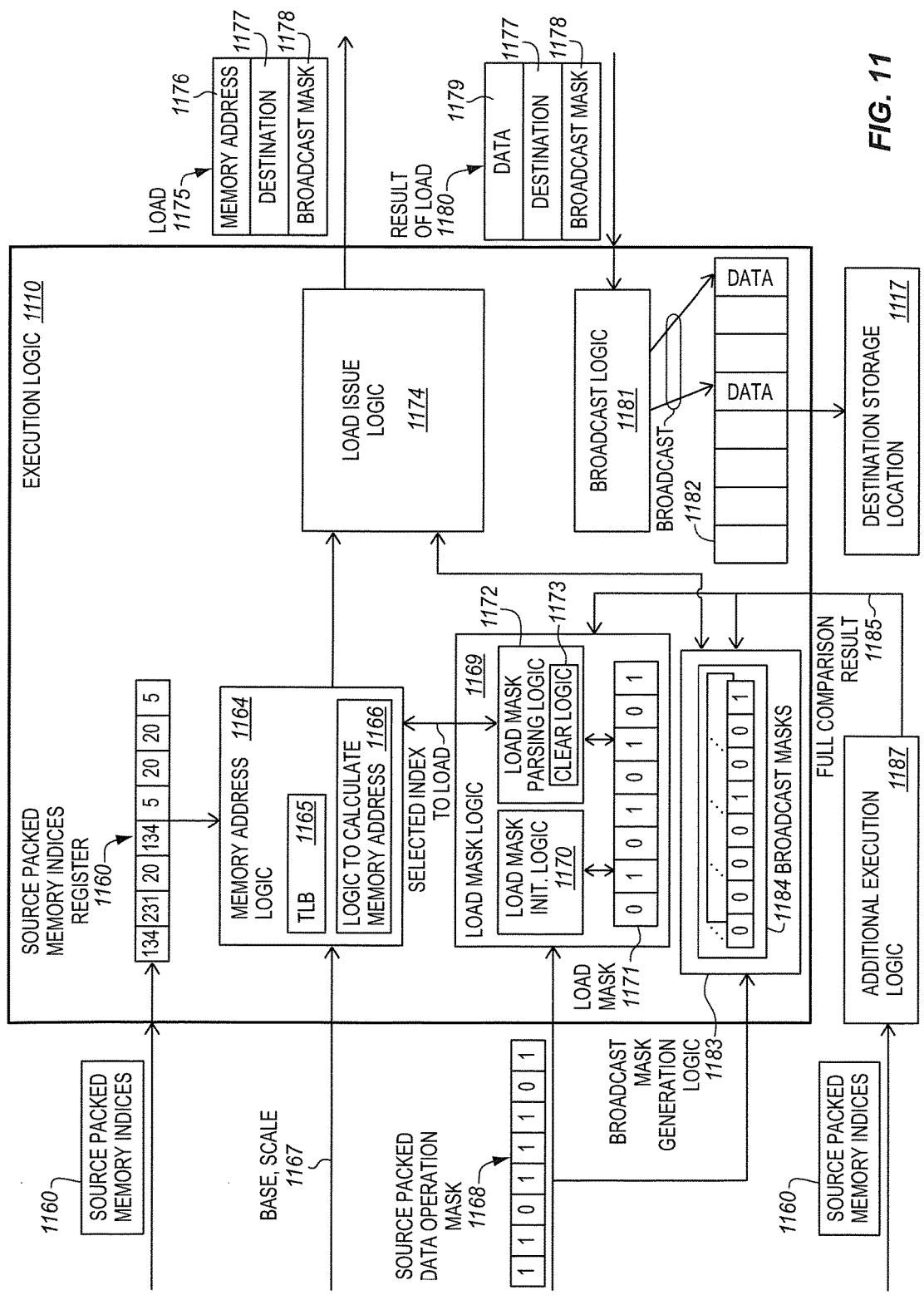
FIG. 11 is a block diagram of a second detailed embodiment of execution logic to perform a gather operation in response to a gather instruction.

FIG. 10 is a block diagram of a second detailed embodiment of a method 1056 of performing a gather operation in response to a gather instruction in which memory indices are compared outside of a load loop. FIG. 11 is a block diagram of a second detailed embodiment of execution logic 1110 to perform a gather operation in response to a gather instruction. In some embodiments, the execution logic may represent logic (e.g., a finite state machine) of a memory execution cluster or memory subsystem of a processor. To better illustrate certain concepts, the method 1056 of FIG. 10 with be described in conjunction with the execution logic 1110 of FIG. 11. However, it is to be appreciated that the method 1056 may be performed by execution logic entirely different than the execution logic 1110 and that the execution logic 1110 can perform methods entirely different than the method 1056. Moreover, the method of FIG. 10 has similarities to the method of FIG. 8. Also, the execution logic of FIG. 11 has similarities to the execution logic of FIG. 9. To avoid obscuring the description, the discussion below will tend to emphasize the additional or different aspects rather than repeating all of the similarities and especially rather than repeating all of the design alternatives or alternate embodiments that are possible. However, it is to be appreciated that, except where mentioned or otherwise clearly apparent, the characteristics, design alternatives, and alternative embodiments described for FIGS. 8-9 also apply to FIGS. 10-11.

Referring to FIG. 10, at block 1057, the gather instruction is received. The gather instruction specifies or otherwise indicates a first source of a packed memory indices, an optional second source of a packed data operation mask, and a destination storage location. For example, as shown in FIG. 11, the source packed memory indices 1160 and the optional source packed data operation mask 1168 may be provided to the execution logic. In addition, as will be explained further below, the source packed memory indices are concurrently provided to additional execution logic 1187. In the illustrated embodiment, the example values of the source packed memory indices are, from most significant end to least significant end, 134, 231, 20, 134, 5, 20, 20, 5. In the illustrated embodiment, the example values of the source packed data operation mask are, from most significant end to least significant end, 11011101. In other embodiments, there may be fewer or more memory indices and correspondingly fewer or more packed data operation mask bits.

At block 1058, a comparison of the memory indices with one another is performed. Notice that the comparison at block 1058, in this embodiment, is outside of the load loop (e.g., the loop through blocks 1061 through 1066). In other words, the comparisons are performed once in batch prior to beginning to parse the load mask and issue individual loads in series while working through the load mask. For example, as shown in FIG. 11, additional execution logic 1187 may compare the memory indices with one another. Although not required, in some embodiments, to avoid duplicating logic, the additional execution logic 1187 may be separate from the execution logic 1110 conventionally used to implement gather instructions (e.g., reused logic used for other purposes and repurposed for the gather operation), although the scope is not so limited. Note that, in this embodiment, as opposed to the approach shown in FIGS. 8-9, the comparison is not just of a single selected memory index with other memory indices. Rather, the comparison is of each memory index with all other memory indexes between itself and a given end of the packed memory indices (e.g., a most significant end or alternatively a least significant end). For example, the least significant memory index in position 0 (having a value of 5) may be compared with all other more significant memory indices in positions 1-7, the next least significant memory index in position 1 (having a value of 20) may be compared with all other more significant memory indices in positions 2-7, and so on. Further comparisons of these details will be discussed further below. In some embodiments, all of these comparisons may be performed substantially concurrently (e.g., within one, two, or a very few clock cycles).

Now, performing so many comparisons substantially concurrently generally tends to involve a relatively large amount of logic. While it is entirely possible and suitable to include separate dedicated comparison logic solely for the purpose of performing the gather operation, in some implementations the inclusion of so much logic will not be a favored approach. As another option, some processors execute other instructions that perform such rapid concurrent comparisons and existing comparison logic associated with those instructions may optionally be reused or repurposed for the gather operation. One such example of an instruction is a vector conflict instruction. A vector conflict instruction and comparisons/comparison logic for the vector conflict instruction are disclosed in commonly-assigned co-pending U.S. Patent Application Publication 20120166761, entitled VECTOR CONFLICT INSTRUCTIONS, filed Dec. 22, 2010, Ser. No. 12/976,616. Alternatively, in other embodiments, comparison logic as described herein may optionally be included whether or not that logic is used for a vector conflict instruction or any other instruction besides a gather instruction or other memory access instruction. In some embodiments, the source packed memory indices may be provided substantially concurrently to both the execution logic 1110 and the additional execution logic 1187 (e.g., optionally through signals conveyed on the same interconnects) to allow concurrent processing and generally help to reduce the overall latency of implementing the gather instruction.

As before, in some embodiments, the comparison may be made based on the memory indices as they exist in the source packed memory indices operand. This is as opposed to a comparison of memory addresses that have been generated from the memory indices (e.g., as index*scale+base). The memory indices can be compared directly without calculation which is fast and efficient, whereas the comparing the memory addresses takes additional time and adds complexity to the implementation. Moreover, since duplicate memory indexes generate duplicate addresses (e.g., since the scale and base are common to all memory indices) it is sufficient to compare the memory indices directly to spot duplicates.

Referring to FIG. 10, at block 1059, a load mask may be initialized based on both the indicated packed data operation mask as well as a result of the comparison of the memory indices with one another. Recall that in the approach of FIGS. 8-9 the load mask was initialized based on the packed data operation mask but not based on the results of comparison of memory indices with one another. The packed data operation mask may be used to determine those loads which do not need to be performed because they are masked out. The results of the comparison of the memory indices may be used to eliminate duplicate memory indices from the load mask. For example, as shown in FIG. 11, the source packed data operation mask 1168 may be provided to load mask logic 1169. Also, the result of the comparison of the memory indices with one another may be provided to the load mask logic. The load mask logic includes load mask initialization logic 1170 that is operable to initialize a load mask 1171 based on the packed data operation mask as well as the results of the comparison of the memory indices. In the illustrated embodiment, the load mask is an 8-bit mask, although the scope of the invention is not so limited. In the illustrated example, the initialized load mask has a value 01010101 taking into account which memory indices are masked out and which have duplicates that need not be loaded.

Referring to FIG. 10, at block 1060, if the result of the comparison of the memory indices with one another indicates that there are one or more sets of duplicate memory indices, then one or more corresponding broadcast masks may be generated based on the result of the comparison of the memory indices with one another. Each broadcast mask may correspond to a different unique memory index having duplicate(s) and may indicate which memory indices are duplicates for the given memory index. For example, as shown in FIG. 11, the execution logic includes broadcast mask generation logic 1183 that is operable to receive and use the result of the comparison of the memory indices to generate one or more broadcast masks 1184. The broadcast masks may be generated in batch prior to the load loop (e.g., the loop through blocks 1061 through 1066) based on the comparison results rather than needing to be generated in series within the load loop (e.g., rather than within the loop of blocks 1061 through 1066). In the illustrated embodiment, the broadcast masks are each 8-bit masks, having one bit per memory index in the source packed memory indices 1160. The first illustrated broadcast mask 1184 is for the least significant memory index in position 0 and has a value 00001001. The set bits in positions zero and three indicate that the corresponding memory indices in positions zero and three are duplicates.

Referring to FIG. 10, at block 1061, while moving from least to most significant ends of the load mask, the next set bit of the load mask and the corresponding memory index (i.e., in a corresponding position) may be selected. This may be done as substantially as described elsewhere herein. As shown in FIG. 11, the load mask logic 1169 includes load mask parsing logic 1172.

Referring to FIG. 10, at block 1062, a memory address (e.g., a virtual memory address) may be generated for the selected memory index. As shown in FIG. 11, the load mask logic may provide a selected index to load, based on its parsing of the load mask, to the memory address logic 1164. The memory address logic may generate a memory address using the selected memory index. The memory address logic may check a TLB 1165 to see if the memory address is present. If not, then logic to calculate the memory address 1166 may calculate the memory address. This may be done as substantially as described elsewhere herein.

Referring to FIG. 10, at block 1063, data may be loaded using the generated memory address, and in some embodiments any broadcast mask generated for the selected memory index may be logically associated with the loaded data. As shown in FIG. 11, the memory address logic 1164 is coupled with load issue logic 1174. The load issue logic may receive the memory address and issue a load 1175 (e.g., a load micro-op or other load operation) of the data. As shown, in some embodiments, the load may include the generated address 1176, an indication of the destination storage location 1177, and in some embodiments the generated broadcast mask 1178.

Referring to FIG. 10, at block 1064, bits (or other active elements) in the load mask corresponding to the selected memory index may be cleared (or otherwise deactivated). In some embodiments, there may be no need to clear bits for duplicates of the selected memory index since these may not have been included in the initialized load mask since the full comparison results were available upon initialization of the load mask and may have been already efficiently removed at that time. For example, as shown in FIG. 11, the load mask may have only one bit set for each memory address in a set of duplicated memory addresses. The clear logic 1173 may clear bits in the load mask 1171.

Referring to FIG. 10, at block 1065, the broadcast mask is used to store the loaded data into data elements of an intermediate result that correspond in position to the selected memory index and any duplicates of the selected memory index. For example, as shown in FIG. 11, a result of the load may be returned to the execution logic 1110. As shown, in some embodiments, the result of the load may include data 1179 loaded from the memory location indicated by the memory address, an indication of the destination storage location 1177, and the generated broadcast mask 1178. Alternatively, other ways of associating the loaded data with the broadcast mask may be used. The result of the load may be provided to broadcast logic 1181. The broadcast logic may store the loaded data 1179 to data elements of an intermediate result 1182 that correspond in position to the duplicates selected memory index and its duplicates. In this particular example, copies of the data are stored at positions zero and three.

Referring to FIG. 10, at block 1066, a determination is made whether the end of the load mask has been reached. This may be done substantially as previously described. If it is determined that the end of the load mask has not been reached (i.e., "no" is the determination at block 1066), the method may revisit block 1061, where the method may attempt to seek another set bit (or other active element) of the load mask and generally repeat the aforementioned operations. Alternatively, if it is determined that the end of the load mask has been reached (i.e., "yes" is the determination at block 1066), the method may advance to block 1067. For example, as shown in FIG. 11, in the present example the load mask parsing logic may parse the load mask and loads may be performed based on the bit positions 2, 4, and 6.

Referring to FIG. 10, at block 1067, the destination storage location indicated by the received gather instruction may be updated with the intermediate result according to the packed data operation mask indicated by the gather instruction. For example, as shown in FIG. 11, after progression of the method has proceeded to completion, the destination storage location 1117 may be updated with the now complete intermediate result 1181 according to the received packed data operation mask 1168. This may be performed as previously described.

In the approach of FIGS. 10-11, the comparison of the memory indices with one another is outside of the load loop (e.g., outside of the loop through blocks 1061 through 1066). Doing the comparison outside of the loop as a batch may tend to facilitate the timing implementation of the gather instruction particularly within the loop. This may be particularly useful if multiple loads are optionally being performed per clock, which may help to increase performance but is not required. Doing the comparisons in batch may tend to slightly increase the initial latency of implementing the gather instruction (e.g., by one or two or several clocks), in order to perform the full comparison at the start, but this increased latency is generally not significant and is usually made up for by increased performance by omitting unnecessary loads for duplicated memory indices.

FIG. 12 shows pseudocode illustrating a particular example embodiment of a method of generating a load mask and broadcast masks that is suitable for the approach shown in FIGS. 10-11. In this pseudocode, the term lanes refers to data element positions. The term later lanes refers to more significant data element positions.

FIG. 13 is a diagram illustrating a particular example embodiment of a comparison result and generating load and broadcast masks based on the comparison result that is suitable for the approach shown in FIGS. 10-11. This example assumes a packed data operation mask of all ones (i.e., no masked out data elements). A full comparison result 1385 represents a comparison of each memory index with all more significant memory indexes. In the illustration, the memory indexes are shown from less significant to more significant from top to bottom and from left to right. Bits are 0 for non-duplicates and 1 for duplicates. The ones in parenthesis (i.e., (1)) indicate comparison of a memory index with itself, which will always give a match. The load mask 1371 may be generated as follows: (a) if there is any 1 in a row aside from a 1 in parenthesis (i.e., (1)) then do not do a load and store a 0 in that row of the load mask; or (b) if there is not any 1's in that row aside from a 1 in parenthesis (i.e., (1)) then do a load and store a 1 in that row of the load mask. The broadcast mask 1384 may be generated as follows: if there is any 1 in a column including a 1 in parenthesis (i.e., (1)) then broadcast for that data element unless load mask bit for that column is 0.

Figure 14:
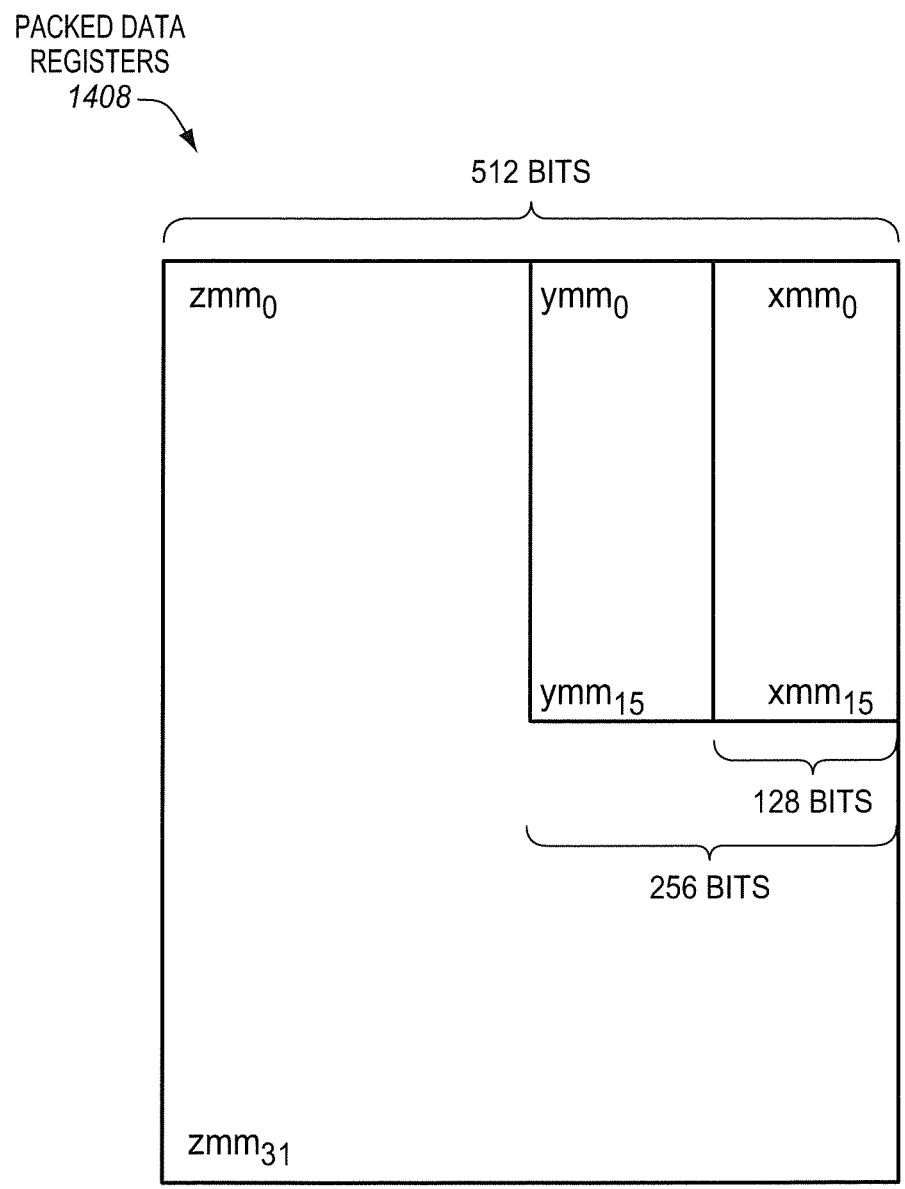
FIG. 14 is a block diagram of an example embodiment of a suitable set of packed data registers.

FIG. 14 is a block diagram of an example embodiment of a suitable set of packed data registers 1408. The illustrated registers include thirty-two 512-bit packed data registers labeled ZMM0 through ZMM31. In the illustrated embodiment, the lower order 256-bits of the lower sixteen of these registers, namely ZMM0-ZMM15, are aliased or overlaid on respective 256-bit packed data registers labeled YMM0-YMM15, although this is not required. Likewise, in the illustrated embodiment, the lower order 128-bits of YMM0-YMM15 are aliased or overlaid on respective 128-bit packed data registers labeled XMM0-XMM15, although this also is not required. The 512-bit registers ZMM0 through ZMM31 are operable to hold 512-bit packed data, 256-bit packed data, or 128-bit packed data. The 256-bit registers YMM0-YMM15 are operable to hold 256-bit packed data, or 128-bit packed data. The 128-bit registers XMM0-XMM15 are operable to hold 128-bit packed data. Each of the registers may be used to store either packed floating-point data or packed integer data. Different data element sizes are supported including at least 8-bit byte data, 16-bit word data, 32-bit doubleword or single precision floating point data, and 64-bit quadword or double precision floating point data. Alternate embodiments of packed data registers may include different numbers of registers, different sizes of registers, and may or may not alias larger registers on smaller registers.

Figure 15A:
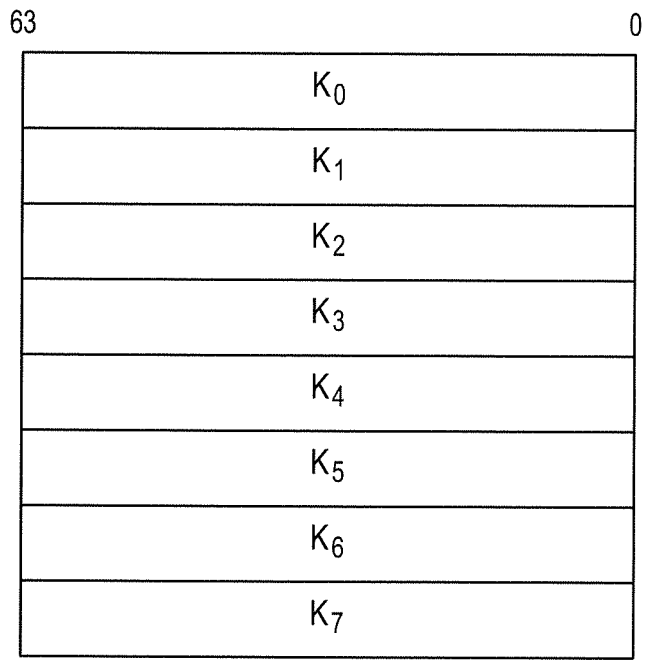
FIG. 15A is a block diagram of an embodiment of a suitable set of packed data operation mask registers.

FIG. 15A is a block diagram of an embodiment of a suitable set of packed data operation mask registers 1509. Each of the mask registers may be used to store a packed data operation mask. In the illustrated embodiment, the set includes eight mask registers labeled k0 through k7. The instructions may use three bits (e.g., a 3-bit field) to encode or specify any one of the eight mask registers k0 through k7. Alternate embodiments may include either fewer than eight (e.g., two, four, six, etc.) or more than eight (e.g., sixteen, twenty, thirty-two, etc.) mask registers. In the illustrated embodiment, each of the mask registers is 64-bits. In alternate embodiments, the widths of the mask registers may be either wider than 64-bits (e.g., 80-bits, 128-bits, etc.), or narrower than 64-bits (e.g., 8-bits, 16-bits, 32-bits, etc.). Alternatively, packed data operation masks may be stored in packed data registers and each mask element may have a same number of bits as a data element it is used to predicate.

Figure 15B:
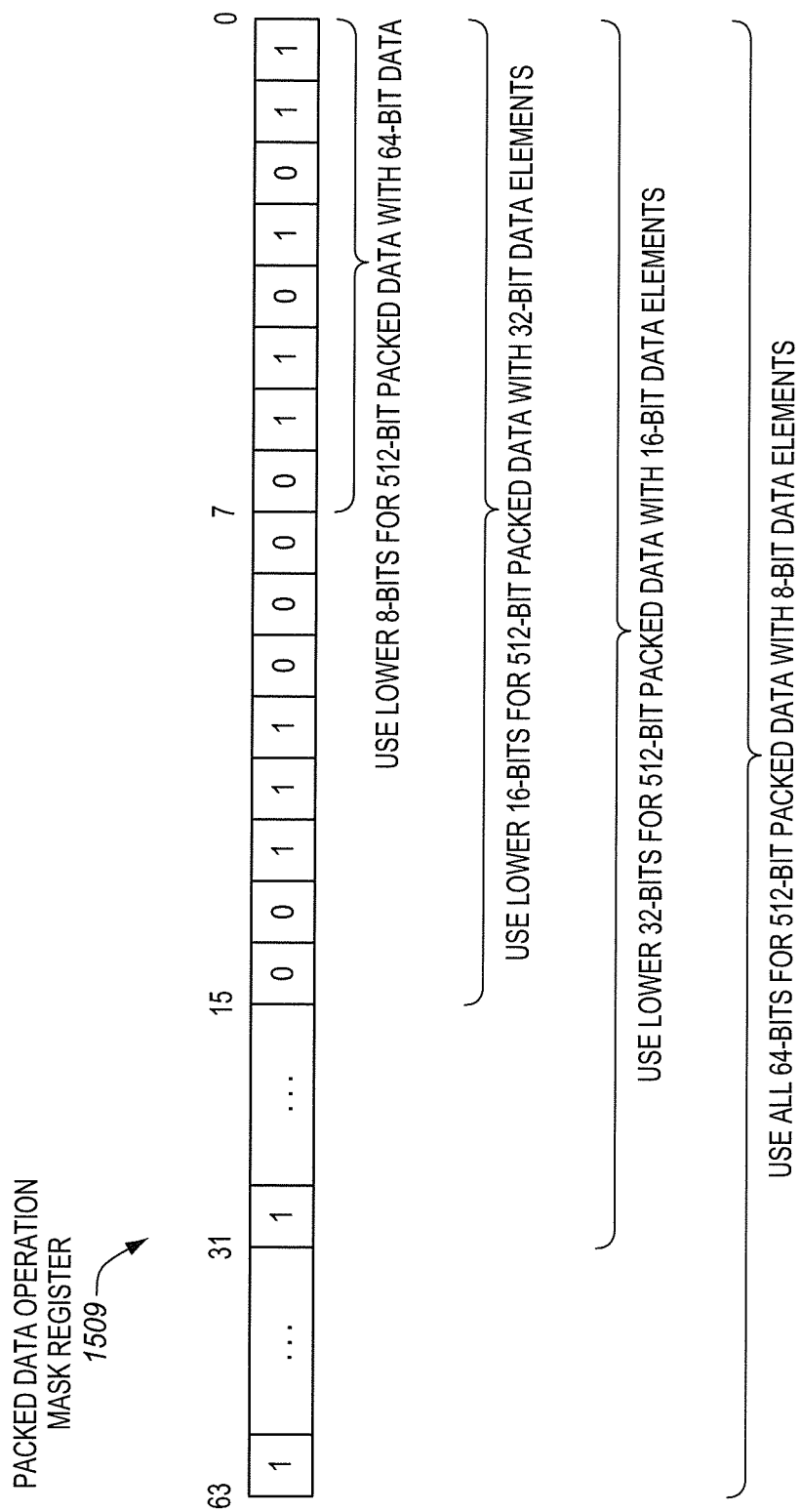
FIG. 15B is a diagram illustrating an example embodiment of a packed data operation mask register and illustrating that the number of bits used as a packed data operation mask and/or for masking depends upon the packed data width and the data element width.

FIG. 15B is a diagram illustrating an example embodiment of a packed data operation mask register 1509 and illustrating that the number of bits used as a packed data operation mask and/or for masking depends upon the packed data width and the data element width. The illustrated mask register is 64-bits wide, although this is not required. Generally, when a single per-element masking control bit is used, the number of bits used for masking is equal to the packed data width in bits divided by the packed data element width in bits. In the illustrated embodiment, only a 512-bit packed data width is considered, however the same concept applies for other packed data widths, such as, for example, 256-bit and 128-bit widths.

An instruction set includes one or more instruction formats. A given instruction format defines various fields (number of bits, location of bits) to specify, among other things, the operation to be performed (opcode) and the operand(s) on which that operation is to be performed. Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to the Advanced Vector Extensions (AVX) (AVX1 and AVX2) and using the Vector Extensions (VEX) coding scheme, has been, has been released and/or published (e.g., see Intel® 64 and IA-32 Architectures Software Developers Manual, October 2411; and see Intel® Advanced Vector Extensions Programming Reference, June 2411).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

VEX Instruction Format

VEX encoding allows instructions to have more than two operands, and allows SIMD vector registers to be longer than 168 bits. The use of a VEX prefix provides for three-operand (or more) syntax. For example, previous two-operand instructions performed operations such as A=A+B, which overwrites a source operand. The use of a VEX prefix enables operands to perform nondestructive operations such as A=B+C.

FIG. 16A illustrates an exemplary AVX instruction format including a VEX prefix 1602, real opcode field 1630, Mod R/M byte 1640, SIB byte 1650, displacement field 1662, and IMM8 1672. FIG. 16B illustrates which fields from FIG. 16A make up a full opcode field 1674 and a base operation field 1642. FIG. 16C illustrates which fields from FIG. 16A make up a register index field 1644.

VEX Prefix (Bytes 0-2) 1602 is encoded in a three-byte form. The first byte is the Format Field 1640 (VEX Byte 0, bits [7:0]), which contains an explicit C4 byte value (the unique value used for distinguishing the C4 instruction format). The second-third bytes (VEX Bytes 1-2) include a number of bit fields providing specific capability. Specifically, REX field 1605 (VEX Byte 1, bits [7-5]) consists of a VEX.R bit field (VEX Byte 1, bit [7]-R), VEX.X bit field (VEX byte 1, bit [6]-X), and VEX.B bit field (VEX byte 1, bit[5]-B). Other fields of the instructions encode the lower three bits of the register indexes as is known in the art (rrr, xxx, and bbb), so that Rrrr, Xxxx, and Bbbb may be formed by adding VEX.R, VEX.X, and VEX.B. Opcode map field 1619 (VEX byte 1, bits [4:0]-mmmmm) includes content to encode an implied leading opcode byte. W Field 1664 (VEX byte 2, bit [7]-W)—is represented by the notation VEX.W, and provides different functions depending on the instruction. The role of VEX.vvvv 1624 (VEX Byte 2, bits [6:3]-vvvv) may include the following: 1) VEX.vvvv encodes the first source register operand, specified in inverted (1s complement) form and is valid for instructions with 2 or more source operands; 2) VEX.vvvv encodes the destination register operand, specified in is complement form for certain vector shifts; or 3) VEX.vvvv does not encode any operand, the field is reserved and should contain 1111b. If VEX.L 1668 Size field (VEX byte 2, bit [2]-L)=0, it indicates 168 bit vector; if VEX.L=1, it indicates 256 bit vector. Prefix encoding field 1625 (VEX byte 2, bits [1:0]-pp) provides additional bits for the base operation field.

Real Opcode Field 1630 (Byte 3) is also known as the opcode byte. Part of the opcode is specified in this field.

MOD R/M Field 1640 (Byte 4) includes MOD field 1642 (bits [7-6]), Reg field 1644 (bits [5-3]), and R/M field 1646 (bits [2-0]). The role of Reg field 1644 may include the following: encoding either the destination register operand or a source register operand (the rrr of Rar), or be treated as an opcode extension and not used to encode any instruction operand. The role of R/M field 1646 may include the following: encoding the instruction operand that references a memory address, or encoding either the destination register operand or a source register operand.

Scale, Index, Base (SIB)—The content of Scale field 1650 (Byte 5) includes SS1652 (bits [7-6]), which is used for memory address generation. The contents of SIB.xxx 1654 (bits [5-3]) and SIB.bbb 1656 (bits [2-0]) have been previously referred to with regard to the register indexes Xxxx and Bbbb.

The Displacement Field 1662 and the immediate field (IMM8) 1672 contain address data.

Exemplary Register Architecture

FIG. 17 is a block diagram of a register architecture 1700 according to one embodiment of the invention. In the embodiment illustrated, there are 32 vector registers 1710 that are 516 bits wide; these registers are referenced as zmm0 through zmm31. The lower order 256 bits of the lower 20 zmm registers are overlaid on registers ymm0-20. The lower order 168 bits of the lower 20 zmm registers (the lower order 168 bits of the ymm registers) are overlaid on registers xmm0-19.

Write mask registers 1719—in the embodiment illustrated, there are 8 write mask registers (k0 through k7), each 64 bits in size. In an alternate embodiment, the write mask registers 1719 are 20 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 1725—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R19.

Scalar floating point stack register file (x87 stack) 1745, on which is aliased the MMX packed integer flat register file 1750—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 18A is a block diagram illustrating both an exemplary in-order pipeline and an exemplary register renaming, out-of-order issue/execution pipeline according to embodiments of the invention. FIG. 18B is a block diagram illustrating both an exemplary embodiment of an in-order architecture core and an exemplary register renaming, out-of-order issue/execution architecture core to be included in a processor according to embodiments of the invention. The solid lined boxes in FIGS. 18A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 18A, a processor pipeline 1800 includes a fetch stage 1802, a length decode stage 1804, a decode stage 1806, an allocation stage 1808, a renaming stage 1810, a scheduling (also known as a dispatch or issue) stage 1816, a register read/memory read stage 1818, an execute stage 1820, a write back/memory write stage 1822, an exception handling stage 1822, and a commit stage 1824.

FIG. 18B shows processor core 1890 including a front end unit 1830 coupled to an execution engine unit 1850, and both are coupled to a memory unit 1870. The core 1890 may be a reduced instruction set computing (RISC) core, a complex instruction set computing (CISC) core, a very long instruction word (VLIW) core, or a hybrid or alternative core type. As yet another option, the core 1890 may be a special-purpose core, such as, for example, a network or communication core, compression engine, coprocessor core, general purpose computing graphics processing unit (GPGPU) core, graphics core, or the like.

The front end unit 1830 includes a branch prediction unit 1832 coupled to an instruction cache unit 1834, which is coupled to an instruction translation lookaside buffer (TLB) 1836, which is coupled to an instruction fetch unit 1838, which is coupled to a decode unit 1840. The decode unit 1840 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1840 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1890 includes a microcode ROM or other medium that stores microcode for certain macroinstructions (e.g., in decode unit 1840 or otherwise within the front end unit 1830). The decode unit 1840 is coupled to a rename/allocator unit 1852 in the execution engine unit 1850.

The execution engine unit 1850 includes the rename/allocator unit 1852 coupled to a retirement unit 1854 and a set of one or more scheduler unit(s) 1856. The scheduler unit(s) 1856 represents any number of different schedulers, including reservations stations, central instruction window, etc. The scheduler unit(s) 1856 is coupled to the physical register file(s) unit(s) 1858. Each of the physical register file(s) units 1858 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1858 comprises a vector registers unit, a write mask registers unit, and a scalar registers unit. These register units may provide architectural vector registers, vector mask registers, and general purpose registers. The physical register file(s) unit(s) 1858 is overlapped by the retirement unit 1854 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1854 and the physical register file(s) unit(s) 1858 are coupled to the execution cluster(s) 1860. The execution cluster(s) 1860 includes a set of one or more execution units 1862 and a set of one or more memory access units 1864. The execution units 1862 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1856, physical register file(s) unit(s) 1858, and execution cluster(s) 1860 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1864). It should also be understood that where separate pipelines are used, one or more of these pipelines may be out-of-order issue/execution and the rest in-order.

The set of memory access units 1864 is coupled to the memory unit 1870, which includes a data TLB unit 1872 coupled to a data cache unit 1874 coupled to a level 2 (L2) cache unit 1876. In one exemplary embodiment, the memory access units 1864 may include a load unit, a store address unit, and a store data unit, each of which is coupled to the data TLB unit 1872 in the memory unit 1870. The instruction cache unit 1834 is further coupled to a level 2 (L2) cache unit 1876 in the memory unit 1870. The L2 cache unit 1876 is coupled to one or more other levels of cache and eventually to a main memory.

By way of example, the exemplary register renaming, out-of-order issue/execution core architecture may implement the pipeline 1800 as follows: 1) the instruction fetch 1838 performs the fetch and length decoding stages 1802 and 1804; 2) the decode unit 1840 performs the decode stage 1806; 3) the rename/allocator unit 1852 performs the allocation stage 1808 and renaming stage 1810; 4) the scheduler unit(s) 1856 performs the schedule stage 1816; 5) the physical register file(s) unit(s) 1858 and the memory unit 1870 perform the register read/memory read stage 1818; the execution cluster 1860 perform the execute stage 1820; 6) the memory unit 1870 and the physical register file(s) unit(s) 1858 perform the write back/memory write stage 1822; 7) various units may be involved in the exception handling stage 1822; and 8) the retirement unit 1854 and the physical register file(s) unit(s) 1858 perform the commit stage 1824.

The core 1890 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1890 includes logic to support a packed data instruction set extension (e.g., AVX1, AVX2), thereby allowing the operations used by many multimedia applications to be performed using packed data.

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1834/1874 and a shared L2 cache unit 1876, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 19B:
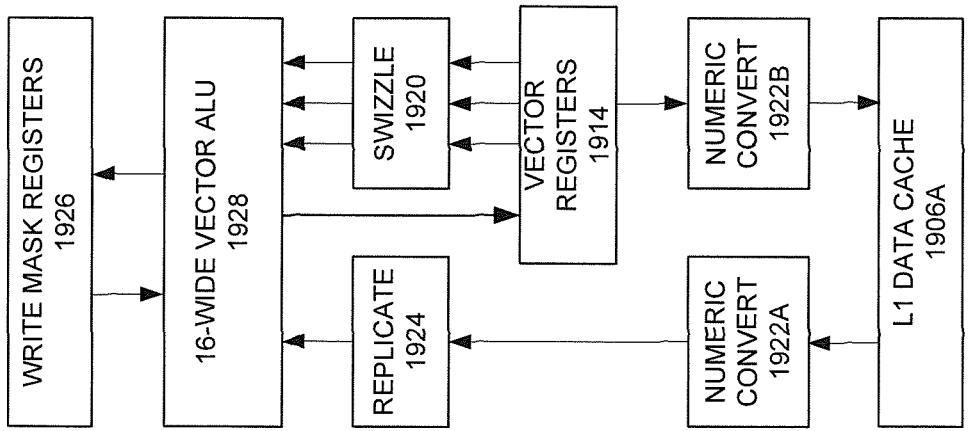
FIG. 19B is an expanded view of part of the processor core in FIG. 19A according to embodiments of the invention.
Figure 19A:
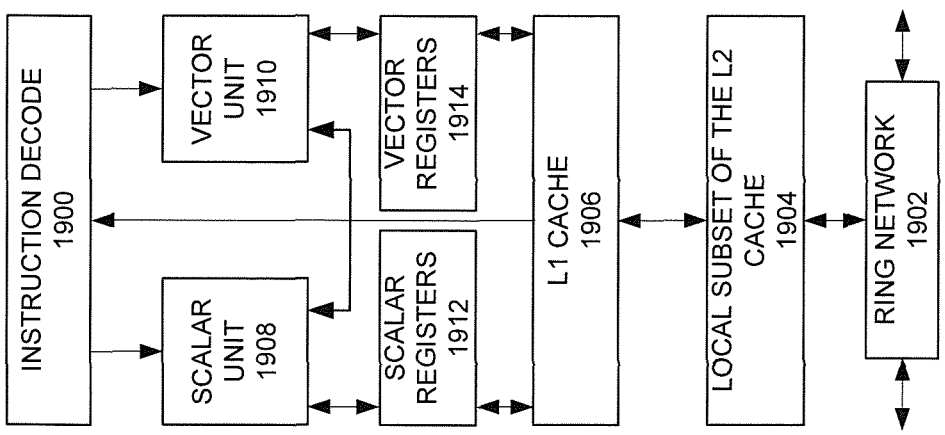
FIG. 19A is a block diagram of a single processor core, along with its connection to the on-die interconnect network and with its local subset of the Level 2 (L2) cache, according to embodiments of the invention.

FIGS. 19A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 19A is a block diagram of a single processor core, along with its connection to the on-die interconnect network 1902 and with its local subset of the Level 2 (L2) cache 1904, according to embodiments of the invention. In one embodiment, an instruction decoder 1900 supports the x86 instruction set with a packed data instruction set extension. An L1 cache 1906 allows low-latency accesses to cache memory into the scalar and vector units. While in one embodiment (to simplify the design), a scalar unit 1908 and a vector unit 1910 use separate register sets (respectively, scalar registers 1916 and vector registers 1918) and data transferred between them is written to memory and then read back in from a level 1 (L1) cache 1906, alternative embodiments of the invention may use a different approach (e.g., use a single register set or include a communication path that allow data to be transferred between the two register files without being written and read back).

The local subset of the L2 cache 1904 is part of a global L2 cache that is divided into separate local subsets, one per processor core. Each processor core has a direct access path to its own local subset of the L2 cache 1904. Data read by a processor core is stored in its L2 cache subset 1904 and can be accessed quickly, in parallel with other processor cores accessing their own local L2 cache subsets. Data written by a processor core is stored in its own L2 cache subset 1904 and is flushed from other subsets, if necessary. The ring network ensures coherency for shared data. The ring network is bi-directional to allow agents such as processor cores, L2 caches and other logic blocks to communicate with each other within the chip. Each ring data-path is 1016-bits wide per direction.

FIG. 19B is an expanded view of part of the processor core in FIG. 19A according to embodiments of the invention. FIG. 19B includes an L1 data cache 1906A part of the L1 cache 1904, as well as more detail regarding the vector unit 1910 and the vector registers 1918. Specifically, the vector unit 1910 is a 20-wide vector processing unit (VPU) (see the 20-wide ALU 1928), which executes one or more of integer, single-precision float, and double-precision float instructions. The VPU supports swizzling the register inputs with swizzle unit 1924, numeric conversion with numeric convert units 1922A-B, and replication with replication unit 1924 on the memory input. Write mask registers 1926 allow predicating resulting vector writes.

Processor with Integrated Memory Controller and Graphics

Figure 20:
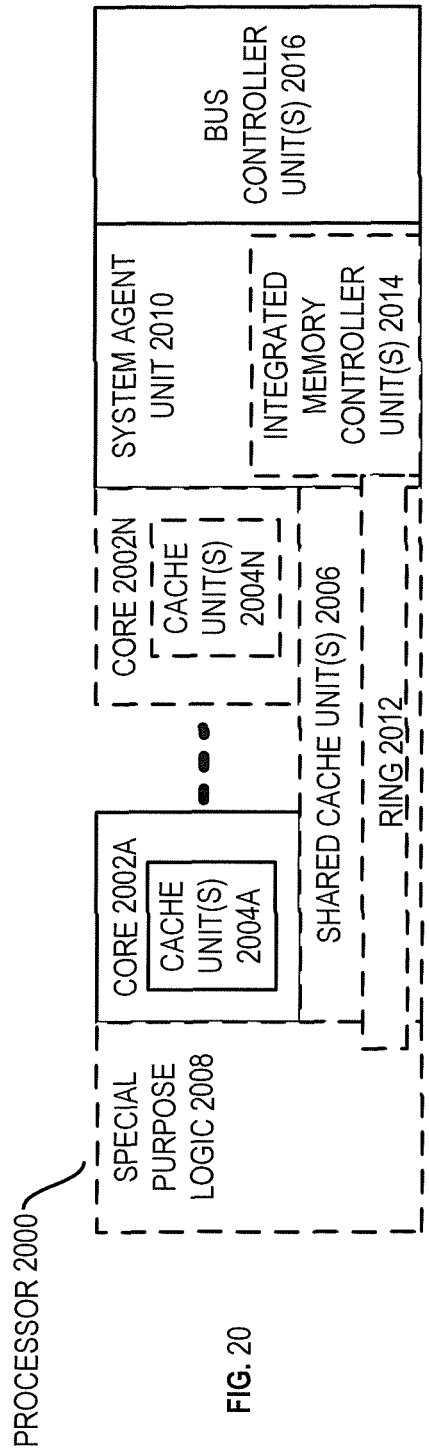
FIG. 20 is a block diagram of a processor that may have more than one core, may have an integrated memory controller, and may have integrated graphics according to embodiments of the invention.

FIG. 20 is a block diagram of a processor 2000 that may have more than one core, may have an integrated memory controller, and may have integrated graphics according to embodiments of the invention. The solid lined boxes in FIG. 20 illustrate a processor 2000 with a single core 2002A, a system agent 2010, a set of one or more bus controller units 2020, while the optional addition of the dashed lined boxes illustrates an alternative processor 2000 with multiple cores 2002A-N, a set of one or more integrated memory controller unit(s) 2018 in the system agent unit 2010, and special purpose logic 2008.

Thus, different implementations of the processor 2000 may include: 1) a CPU with the special purpose logic 2008 being integrated graphics and/or scientific (throughput) logic (which may include one or more cores), and the cores 2002A-N being one or more general purpose cores (e.g., general purpose in-order cores, general purpose out-of-order cores, a combination of the two); 2) a coprocessor with the cores 2002A-N being a large number of special purpose cores intended primarily for graphics and/or scientific (throughput); and 3) a coprocessor with the cores 2002A-N being a large number of general purpose in-order cores. Thus, the processor 2000 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 2000 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 2006, and external memory (not shown) coupled to the set of integrated memory controller units 2018. The set of shared cache units 2006 may include one or more mid-level caches, such as level 2 (L2), level 3 (L3), level 4 (L4), or other levels of cache, a last level cache (LLC), and/or combinations thereof. While in one embodiment a ring based interconnect unit 2016 interconnects the integrated graphics logic 2008, the set of shared cache units 2006, and the system agent unit 2010/integrated memory controller unit(s) 2018, alternative embodiments may use any number of well-known techniques for interconnecting such units. In one embodiment, coherency is maintained between one or more cache units 2006 and cores 2002-A-N.

In some embodiments, one or more of the cores 2002A-N are capable of multi-threading. The system agent 2010 includes those components coordinating and operating cores 2002A-N. The system agent unit 2010 may include for example a power control unit (PCU) and a display unit. The PCU may be or include logic and components needed for regulating the power state of the cores 2002A-N and the integrated graphics logic 2008. The display unit is for driving one or more externally connected displays.

The cores 2002A-N may be homogenous or heterogeneous in terms of architecture instruction set; that is, two or more of the cores 2002A-N may be capable of execution the same instruction set, while others may be capable of executing only a subset of that instruction set or a different instruction set.

Exemplary Computer Architectures

FIGS. 21-24 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 21:
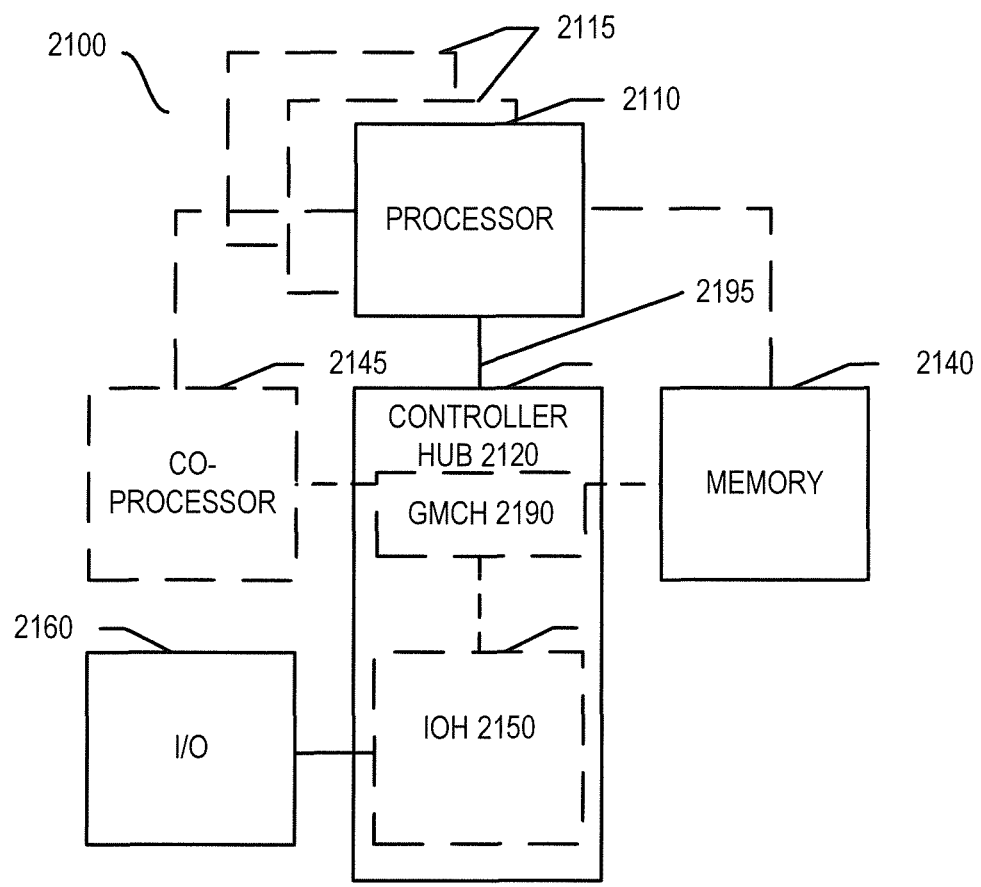
FIG. 21, shown is a block diagram of a system in accordance with one embodiment of the present invention.

Referring now to FIG. 21, shown is a block diagram of a system 2100 in accordance with one embodiment of the present invention. The system 2100 may include one or more processors 2110, 2119, which are coupled to a controller hub 2124. In one embodiment the controller hub 2124 includes a graphics memory controller hub (GMCH) 2190 and an Input/Output Hub (IOH) 2150 (which may be on separate chips); the GMCH 2190 includes memory and graphics controllers to which are coupled memory 2140 and a coprocessor 2145; the IOH 2150 is couples input/output (I/O) devices 2160 to the GMCH 2190. Alternatively, one or both of the memory and graphics controllers are integrated within the processor (as described herein), the memory 2140 and the coprocessor 2145 are coupled directly to the processor 2110, and the controller hub 2124 in a single chip with the IOH 2150.

The optional nature of additional processors 2119 is denoted in FIG. 21 with broken lines. Each processor 2110, 2119 may include one or more of the processing cores described herein and may be some version of the processor 2000.

The memory 2140 may be, for example, dynamic random access memory (DRAM), phase change memory (PCM), or a combination of the two. For at least one embodiment, the controller hub 2124 communicates with the processor(s) 2110, 2119 via a multi-drop bus, such as a frontside bus (FSB), point-to-point interface such as QuickPath Interconnect (QPI), or similar connection 2195.

In one embodiment, the coprocessor 2145 is a special-purpose processor, such as, for example, a high-throughput MIC processor, a network or communication processor, compression engine, graphics processor, GPGPU, embedded processor, or the like. In one embodiment, controller hub 2124 may include an integrated graphics accelerator.

There can be a variety of differences between the physical resources 2110, 2119 in terms of a spectrum of metrics of merit including architectural, microarchitectural, thermal, power consumption characteristics, and the like.

In one embodiment, the processor 2110 executes instructions that control data processing operations of a general type. Embedded within the instructions may be coprocessor instructions. The processor 2110 recognizes these coprocessor instructions as being of a type that should be executed by the attached coprocessor 2145. Accordingly, the processor 2110 issues these coprocessor instructions (or control signals representing coprocessor instructions) on a coprocessor bus or other interconnect, to coprocessor 2145. Coprocessor(s) 2145 accept and execute the received coprocessor instructions.

Figure 22:
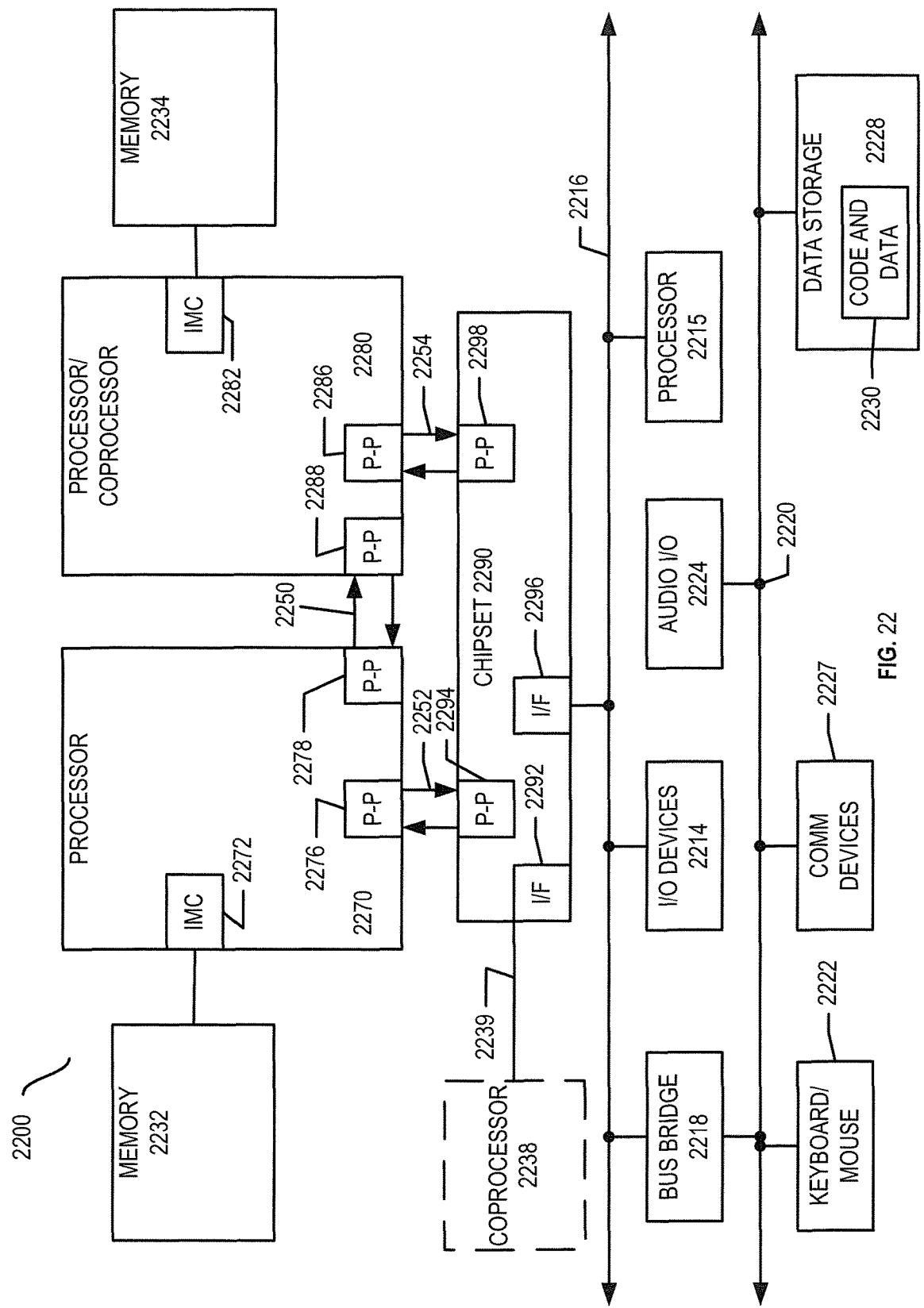
FIG. 22 shown is a block diagram of a first more specific exemplary system in accordance with an embodiment of the present invention.

Referring now to FIG. 22, shown is a block diagram of a first more specific exemplary system 2200 in accordance with an embodiment of the present invention. As shown in FIG. 22, multiprocessor system 2200 is a point-to-point interconnect system, and includes a first processor 2270 and a second processor 2280 coupled via a point-to-point interconnect 2250. Each of processors 2270 and 2280 may be some version of the processor 2000. In one embodiment of the invention, processors 2270 and 2280 are respectively processors 2110 and 2119, while coprocessor 2238 is coprocessor 2145. In another embodiment, processors 2270 and 2280 are respectively processor 2110 coprocessor 2145.

Processors 2270 and 2280 are shown including integrated memory controller (IMC) units 2272 and 2282, respectively. Processor 2270 also includes as part of its bus controller units point-to-point (P-P) interfaces 2276 and 2278; similarly, second processor 2280 includes P-P interfaces 2286 and 2288. Processors 2270, 2280 may exchange information via a point-to-point (P-P) interface 2250 using P-P interface circuits 2278, 2288. As shown in FIG. 22, IMCs 2272 and 2282 couple the processors to respective memories, namely a memory 2232 and a memory 2234, which may be portions of main memory locally attached to the respective processors.

Processors 2270, 2280 may each exchange information with a chipset 2290 via individual P-P interfaces 2252, 2254 using point to point interface circuits 2276, 2294, 2286, 2298. Chipset 2290 may optionally exchange information with the coprocessor 2238 via a high-performance interface 2239. In one embodiment, the coprocessor 2238 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 2290 may be coupled to a first bus 2220 via an interface 2296. In one embodiment, first bus 2220 may be a Peripheral Component Interconnect (PCI) bus, or a bus such as a PCI Express bus or another third generation I/O interconnect bus, although the scope of the present invention is not so limited.

As shown in FIG. 22, various I/O devices 2218 may be coupled to first bus 2220, along with a bus bridge 2222 which couples first bus 2220 to a second bus 2224. In one embodiment, one or more additional processor(s) 2219, such as coprocessors, high-throughput MIC processors, GPGPU's, accelerators (such as, e.g., graphics accelerators or digital signal processing (DSP) units), field programmable gate arrays, or any other processor, are coupled to first bus 2220. In one embodiment, second bus 2224 may be a low pin count (LPC) bus. Various devices may be coupled to a second bus 2224 including, for example, a keyboard and/or mouse 2222, communication devices 2227 and a storage unit 2228 such as a disk drive or other mass storage device which may include instructions/code and data 2230, in one embodiment. Further, an audio I/O 2224 may be coupled to the second bus 2224. Note that other architectures are possible. For example, instead of the point-to-point architecture of FIG. 22, a system may implement a multi-drop bus or other such architecture.

Figure 23:
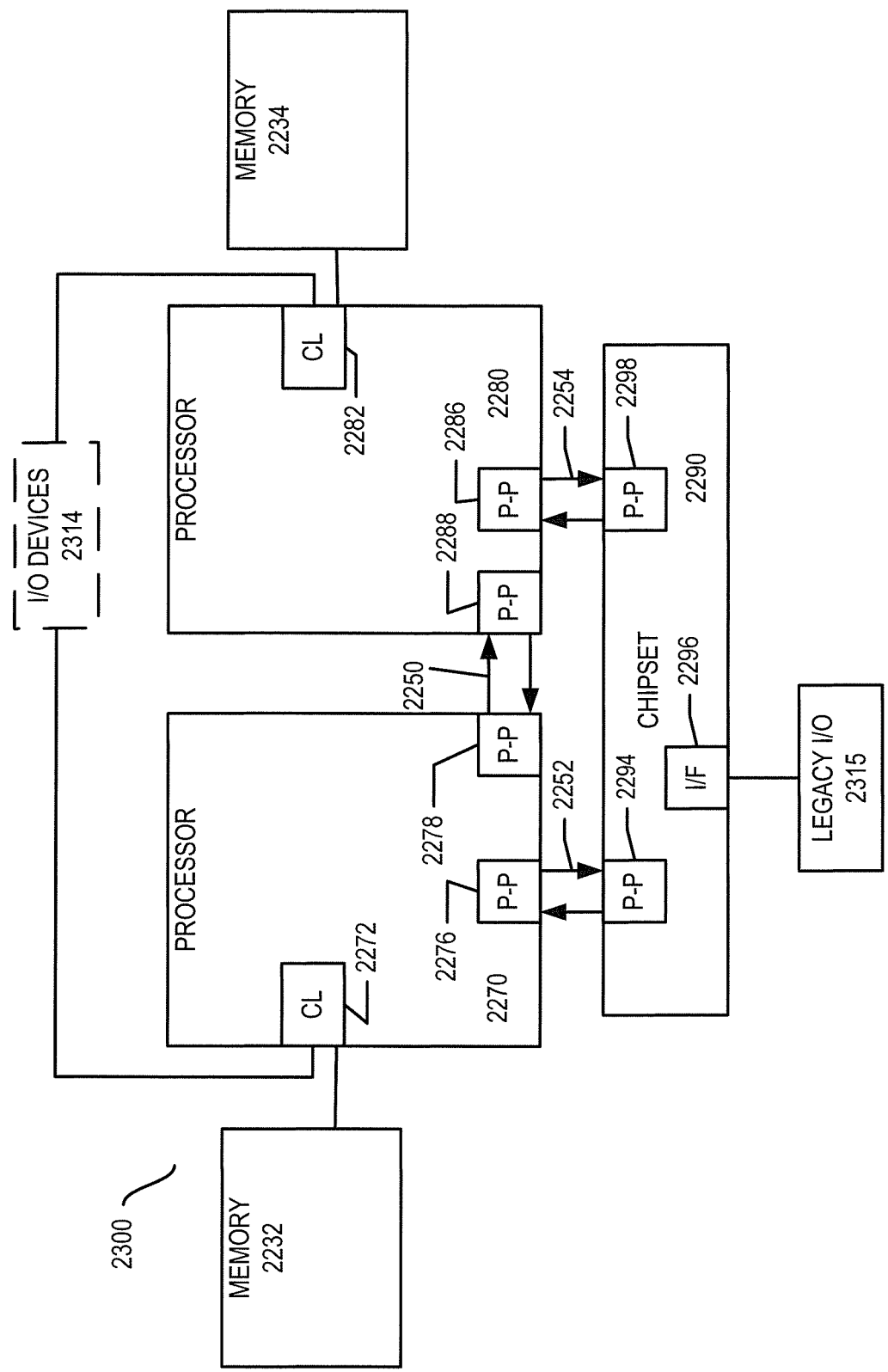
FIG. 23 shown is a block diagram of a second more specific exemplary system in accordance with an embodiment of the present invention.

Referring now to FIG. 23, shown is a block diagram of a second more specific exemplary system 2300 in accordance with an embodiment of the present invention. Like elements in FIGS. 22 and 23 bear like reference numerals, and certain aspects of FIG. 22 have been omitted from FIG. 23 in order to avoid obscuring other aspects of FIG. 23.

FIG. 23 illustrates that the processors 2270, 2280 may include integrated memory and I/O control logic ("CL") 2272 and 2282, respectively. Thus, the CL 2272, 2282 include integrated memory controller units and include I/O control logic. FIG. 23 illustrates that not only are the memories 2232, 2234 coupled to the CL 2272, 2282, but also that I/O devices 2318 are also coupled to the control logic 2272, 2282. Legacy I/O devices 2319 are coupled to the chipset 2290.

Figure 24:
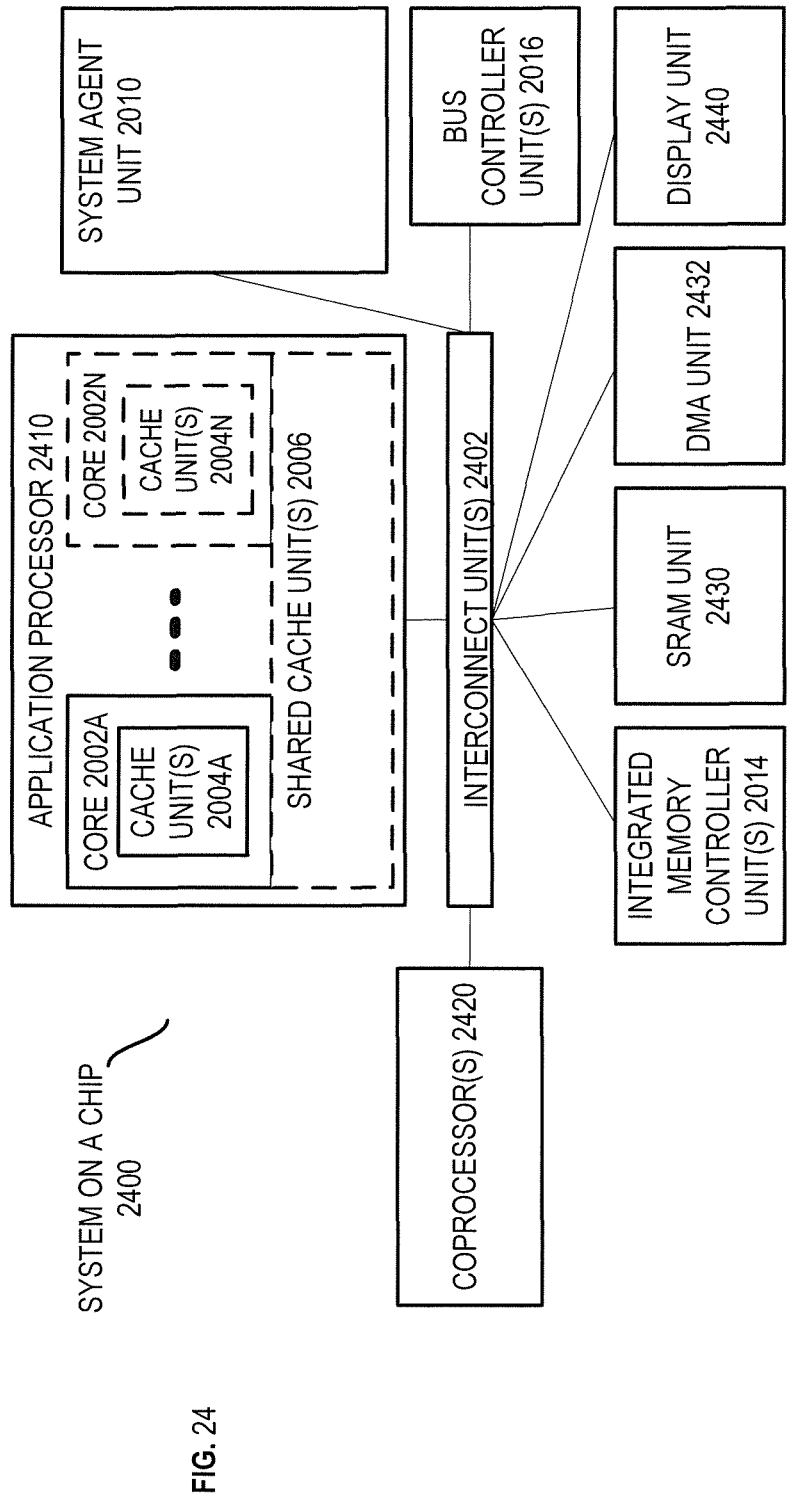
FIG. 24, shown is a block diagram of a in accordance with an embodiment of the present invention.

Referring now to FIG. 24, shown is a block diagram of a SoC 2400 in accordance with an embodiment of the present invention. Similar elements in FIG. 20 bear like reference numerals. Also, dashed lined boxes are optional features on more advanced SoCs. In FIG. 24, an interconnect unit(s) 2402 is coupled to: an application processor 2410 which includes a set of one or more cores 242A-N and shared cache unit(s) 2006; a system agent unit 2010; a bus controller unit(s) 2020; an integrated memory controller unit(s) 2018; a set or one or more coprocessors 2424 which may include integrated graphics logic, an image processor, an audio processor, and a video processor; an static random access memory (SRAM) unit 2430; a direct memory access (DMA) unit 2432; and a display unit 2440 for coupling to one or more external displays. In one embodiment, the coprocessor(s) 2424 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 2230 illustrated in FIG. 22, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 25 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 25 shows a program in a high level language 2502 may be compiled using an x86 compiler 2504 to generate x86 binary code 2506 that may be natively executed by a processor with at least one x86 instruction set core 2520. The processor with at least one x86 instruction set core 2520 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 2504 represents a compiler that is operable to generate x86 binary code 2506 (e.g., object code) that can, with or without additional linkage processing, be executed on the processor with at least one x86 instruction set core 2520. Similarly, FIG. 25 shows the program in the high level language 2502 may be compiled using an alternative instruction set compiler 2508 to generate alternative instruction set binary code 2510 that may be natively executed by a processor without at least one x86 instruction set core 2518 (e.g., a processor with cores that execute the MIPS instruction set of MIPS Technologies of Sunnyvale, Calif. and/or that execute the ARM instruction set of ARM Holdings of Sunnyvale, Calif.). The instruction converter 2516 is used to convert the x86 binary code 2506 into code that may be natively executed by the processor without an x86 instruction set core 2518. This converted code is not likely to be the same as the alternative instruction set binary code 2510 because an instruction converter capable of this is difficult to make; however, the converted code will accomplish the general operation and be made up of instructions from the alternative instruction set. Thus, the instruction converter 2516 represents software, firmware, hardware, or a combination thereof that, through emulation, simulation or any other process, allows a processor or other electronic device that does not have an x86 instruction set processor or core to execute the x86 binary code 2506.

The terms "coupled" and/or "connected," along with their derivatives, have be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. For example, an execution unit may be coupled with a register or a decoder through one or more intervening components. In the figures, arrows are used to show couplings and/or connections.

As used herein, the term logic may include hardware, firmware, software, or various combinations thereof. Examples of logic include integrated circuitry, application specific integrated circuits, analog circuits, digital circuits, programmed logic devices, memory devices including instructions, etc. In some embodiments, the logic may include hardware (e.g., transistors, gates, resistors, etc.) potentially along with firmware and/or software.

Specific details have been set forth in order to provide a thorough understanding of the embodiments. However, other embodiments may be practiced without some of these specific details. The scope of the invention is not to be determined by the specific examples provided above but only by the claims below. All equivalent relationships to those illustrated in the drawings and described in the specification are encompassed within embodiments. In other instances, well-known circuits, structures, devices, and operations have been shown in block diagram form or without detail in order to avoid obscuring the understanding of the description. Where a single component has been shown and described, in some cases this single component may be separated into two or more components.

Certain methods disclosed herein have been shown and described in a basic form, although operations may optionally be added to and/or removed from the methods. In addition, a particular order of the operations may have been shown and/or described, although alternate embodiments may perform certain operations in different order, combine certain operations, overlap certain operations, etc.

Certain operations may be performed by hardware components and/or may be embodied in a machine-readable, machine-executable, or circuit-executable instruction that may be used to cause and/or result in a hardware component (e.g., a processor, portion of a processor, integrated circuitry, etc.) performing the operations in response to the instruction. The operations may be performed by a combination of hardware, software, and/or firmware. The hardware component may include specific or particular logic (e.g., circuitry potentially combined with software and/or firmware) that is operable to execute and/or process the instruction and store a result in response to the instruction (e.g., in response to one or more microinstructions or other control signals derived from the instruction).

One or more embodiments include an article of manufacture (e.g., a computer program product) that includes a machine-readable medium that stores data in a form that is readable by a machine. The medium may store one or more instructions that when executed by the machine cause the machine to perform one or more operations or methods disclosed herein. In one embodiment, the medium may include a tangible non-transitory machine-readable storage medium. For example, the medium may include a floppy diskette, an optical storage medium, an optical disk, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, or a combinations thereof. The tangible medium may include one or more solid or tangible physical materials, such as, for example, a semiconductor material, a phase change material, a magnetic material, etc.

Reference throughout this specification to "one embodiment," "an embodiment," "one or more embodiments," "some embodiments," for example, indicates that a particular feature may be included in the practice of the invention but is not necessarily required to be. Similarly, in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects lie in less than all features of a single disclosed embodiment. Thus, the claims following the Detailed Description are hereby expressly incorporated into this Detailed Description, with each claim standing on its own as a separate embodiment of the invention.

What is claimed is:

1. A method comprising:
   receiving an instruction, the instruction indicating a first source packed memory indices, indicating a second source packed data operation mask, and indicating a destination storage location;
   comparing memory indices of the first source packed memory indices with one another for equality;
   identifying one or more sets of duplicate identical memory indices;
   loading data corresponding to each set of duplicate memory indices only once;
   replicating the loaded data corresponding to each set of duplicate memory indices for each of the duplicate memory indices in the set that is not blocked by a corresponding element of the second source packed data operation mask; and
   storing a packed data result in the destination storage location in response to the instruction, the packed data result including data elements from memory locations that are indicated by corresponding memory indices of the packed memory indices when not blocked by corresponding elements of the second source packed data operation mask.

2. The method of claim 1, wherein comparing the memory indices comprises comparing the memory indices prior to generating memory addresses from the memory indices.

3. The method of claim 1, further comprising:
generating a broadcast mask indicating a set of duplicate memory indices; and
replicating data loaded for the set of duplicate memory indices for each of the duplicate memory indices in the set using the generated broadcast mask.

4. The method of claim 3, further comprising logically associating a load for the data with the generated broadcast mask.

5. The method of claim 1, further comprising:
selecting a memory index of the packed memory indices;
comparing the selected memory index to all more significant memory indices of the packed memory indices; and
generating a broadcast mask to indicate at least one of the more significant memory indices that is a duplicate of the selected memory index.

6. The method of claim 1, wherein comparing comprises:
comparing a first memory index to a plurality other memory indices before loading data for the first memory index; and
comparing a second memory index to a plurality of other memory indices after loading the data for the first memory index.

7. The method of claim 1, wherein comparing comprises comparing each of the packed memory indices to one or more other memory indices before loading data for any of the packed memory indices.

8. The method of claim 1, wherein receiving comprises receiving an instruction indicating a first source packed memory indices that is at least 512-bits wide and that has 64-bit memory indices.

9. An apparatus comprising:
a plurality of packed data registers;
a decoder to decode an instruction, the instruction to indicate a first source packed memory indices; and
execution logic coupled with the decoder and coupled with the packed data registers, the execution logic comprising:
comparison logic including at least some circuitry to compare memory indices of the first source packed memory indices with one another for equality and to identify a set of duplicate equal memory indices;
broadcast mask generation logic coupled with the comparison logic and including at least some circuitry, the broadcast mask generation logic to generate a broadcast mask indicating that is to indicate the set of duplicate memory indices;
load logic including at least some circuitry to load data for the set of duplicate memory indices only once; and
broadcast logic including at least some circuitry to broadcast the data loaded for the set of duplicate memory indices to each of the duplicate memory indices in the set using the generated broadcast mask.

10. The apparatus of claim 9, wherein the comparison logic is to compare the memory indices before memory addresses are generated from the memory indices.

11. The apparatus of claim 9, wherein the comparison logic is to:

compare a first memory index to a plurality other memory indices before data is loaded for the first memory index; and
compare a second memory index to a plurality of other memory indices after data is loaded for the first memory index.

12. The apparatus of claim 9, wherein the comparison logic is to batch compare each of the packed memory indices to one of all more significant memory indices and all less significant memory indices.

13. The apparatus of claim 9, wherein the comparison logic is to compare each of the packed memory indices to one or more other memory indices before data is loaded for any of the packed memory indices.

14. The apparatus of claim 9, wherein the comparison logic is also used to implement a vector conflict instruction.

15. The apparatus of claim 9, wherein the first packed memory indices is at least 512-bits wide and has 64-bit memory indices.

16. A system comprising:
an interconnect;
a processor coupled with the interconnect, the processor to receive an instruction, the instruction to indicate a first source packed memory indices, the processor comprising:
comparison logic including at least some circuitry to compare the memory indices of the first source packed memory indices with one another for equality and to identify a set of duplicate equal memory indices;
broadcast mask generation logic coupled with the comparison logic and including at least some circuitry, the broadcast mask generation logic to generate a broadcast mask that is to indicate the set of duplicate memory indices;
load logic including at least some circuitry to load data for the set of duplicate memory indices only once; and
broadcast logic including at least some circuitry to broadcast the data loaded for the set of duplicate memory indices to each of the duplicate memory indices in the set using the generated broadcast mask; and
a dynamic random access memory (DRAM) coupled with the interconnect.

17. The system of claim 16, wherein the comparison logic is to:
compare a first memory index to a plurality other memory indices before data is loaded for the first memory index; and
compare a second memory index to a plurality of other memory indices after data is loaded for the first memory index.

18. The system of claim 16, wherein the comparison logic is to compare each of the packed memory indices to one or more other memory indices before data is loaded for any of the packed memory indices.

19. An article of manufacture comprising:
a tangible non-transitory machine-readable storage medium storing a gather instruction, the gather instruction to indicate a packed memory indices, the gather instruction if executed by a machine operable to cause the machine to perform operations comprising to:
compare the packed memory indices with one another for equality;
identify a set of duplicate identical memory indices;

generate a broadcast mask that is to indicate the set of duplicate memory indices;
load data for the set of duplicate memory indices only once; and
broadcast the data loaded for the set of duplicate memory indices to each of the duplicate memory indices in the set using the generated broadcast mask.

20. The article of manufacture of claim 19, wherein the machine-readable storage medium comprises a random access memory of the machine.

21. The article of manufacture of claim 19, wherein comparing the packed memory indices is performed in batch prior to loading data for any of the packed memory indices.

22. An apparatus comprising:
a plurality of packed data registers;
a decoder to decode an instruction, the instruction to indicate a first source packed memory indices; and
an execution unit coupled with the decoder and coupled with the packed data registers, the execution unit including comparison circuitry and load issue circuitry, the execution unit, in response to the instruction, operative to:
compare memory indices of the first source packed memory indices with one another for equality and to identify a set of duplicate equal memory indices;
generate a broadcast mask that is to indicate the set of duplicate memory indices;
load data for the set of duplicate memory indices only once; and
broadcast the data loaded for the set of duplicate memory indices to each of the duplicate memory indices in the set using the generated broadcast mask.

23. The apparatus of claim 22, wherein the execution unit is to compare the memory indices before memory addresses are generated from the memory indices.

24. The apparatus of claim 22, wherein the execution unit is to:
compare a first memory index to a plurality other memory indices before data is loaded for the first memory index; and
compare a second memory index to a plurality of other memory indices after data is loaded for the first memory index.

25. The apparatus of claim 22, wherein the execution unit is to batch compare each of the memory indices to one of all more significant memory indices and all less significant memory indices.

26. The apparatus of claim 22, wherein the execution unit is to compare each of the memory indices to one or more other memory indices before data is loaded for any of the memory indices.

* * * * *

UNITED STATES PATENT AND TRADEMARK OFFICE
CERTIFICATE OF CORRECTION

PATENT NO. : 9,842,046 B2  
APPLICATION NO. : 13/631378  
DATED : December 12, 2017  
INVENTOR(S) : Andrew T. Forsyth et al.

Page 1 of 1

It is certified that error appears in the above-identified patent and that said Letters Patent is hereby corrected as shown below:

In the Claims

In Column 35, Line 53, in Claim 9, after "broadcast mask" delete "indicating".

Signed and Sealed this
Sixth Day of February, 2018

Joseph Matal
*Performing the Functions and Duties of the*
*Under Secretary of Commerce for Intellectual Property and*
*Director of the United States Patent and Trademark Office*